(12) United States Patent
Korzeniowski

(10) Patent No.: US 8,723,492 B2
(45) Date of Patent: May 13, 2014

(54) AUTONOMOUS CONTROLLED HEADROOM LOW DROPOUT REGULATOR FOR SINGLE INDUCTOR MULTIPLE OUTPUT POWER SUPPLY

(75) Inventor: Kenneth A. Korzeniowski, Randolph, MA (US)

(73) Assignee: Integrated Device Technology, Inc., San Jose, CA (US)

( * ) Notice: Subject to any disclaimer, the term of this patent is extended or adjusted under 35 U.S.C. 154(b) by 646 days.

(21) Appl. No.: 13/069,329

(22) Filed: Mar. 22, 2011

(65) Prior Publication Data

US 2012/0242309 A1    Sep. 27, 2012

(51) Int. Cl.
*G05F 1/40* (2006.01)
*H02M 3/156* (2006.01)

(52) U.S. Cl.
USPC .......................... 323/273; 323/267; 323/282

(58) Field of Classification Search
USPC .................................. 323/267–277, 280–290
See application file for complete search history.

(56) References Cited

U.S. PATENT DOCUMENTS

| | | |
|---|---|---|
| 4,801,859 A | 1/1989 | Dishner |
| 5,122,728 A | 6/1992 | Ashley |
| 5,444,356 A | 8/1995 | Reynolds et al. |
| 5,479,089 A | 12/1995 | Lee |
| 5,552,695 A | 9/1996 | Schwartz |
| 5,617,015 A | 4/1997 | Goder et al. |
| 5,654,881 A | 8/1997 | Albrecht et al. |
| 5,886,508 A | 3/1999 | Jutras |
| 5,920,475 A | 7/1999 | Boylan et al. |
| 6,031,743 A | 2/2000 | Carpenter et al. |
| 6,037,755 A | 3/2000 | Mao et al. |
| 6,075,295 A | 6/2000 | Li |
| 6,222,352 B1 | 4/2001 | Lenk |
| 6,396,251 B2 * | 5/2002 | Corva et al. ................... 323/283 |
| 6,977,447 B2 | 12/2005 | May |
| 6,979,985 B2 * | 12/2005 | Yoshida et al. ............... 323/282 |
| 7,061,214 B2 | 6/2006 | Mayega et al. |
| 7,084,612 B2 * | 8/2006 | Zinn ............................. 323/266 |
| 7,118,925 B2 | 10/2006 | Brennan et al. |
| 7,224,085 B2 | 5/2007 | Chen et al. |
| 7,373,527 B2 * | 5/2008 | Chapuis ........................ 713/300 |
| 7,626,370 B1 * | 12/2009 | Mei et al. ..................... 323/282 |

* cited by examiner

*Primary Examiner* — Jessica Han

(74) *Attorney, Agent, or Firm* — Bever Hoffman & Harms

(57) ABSTRACT

A controlled headroom low dropout regulator (CHLDO) having an LDO with an input voltage provided by a capacitor. An incremental voltage is added to an output voltage of the LDO to create a reference voltage. The reference voltage is compared to the input voltage to determine when to couple/decouple the capacitor with a current source. If the capacitor is coupled to the current source, the capacitor will charge only if the voltage driven by the current source exceeds the input voltage provided by the capacitor. When the input voltage developed on the capacitor exceeds the reference voltage, the capacitor is automatically de-coupled from the current source. Multiple CHLDOs can be charged from a single current source, wherein charging automatically proceeds from the lowest voltage CHLDO to the highest voltage CHLDO.

32 Claims, 15 Drawing Sheets

CHARGE CYCLE

DISCHARGE CYCLE

AUTONOMOUS CONTROLLED HEADROOM LOW DROPOUT REGULATOR FOR SINGLE INDUCTOR MULTIPLE OUTPUT POWER SUPPLY

FIELD OF THE INVENTION

The present invention relates to a method and structure for providing several autonomous (self-regulated) efficient linear power supply outputs from a single switch-mode power supply.

RELATED ART

Many hand-held portable electronic devices rely on batteries to provide power. For example, a single cell of a Lithium-Ion (Li-Ion) battery provides an output voltage that typically varies between 2.75 Volts and 4.20 Volts over the usable charge lifetime of the battery. Most electronic circuits cannot operate correctly over this wide of a voltage range. Moreover, many electronic circuits require supply voltages that are free of ripple and noise. Linear audio circuits, RF circuits and timing clocks are examples of circuits that could produce errors if powered by either widely varying or noisy voltage sources.

Switch-mode power supplies have been used to stabilize the voltages provided to electronic circuits. Such switch-mode power supplies generate an output voltage in response to an input voltage provided by a battery or other power source, wherein the output voltage may be either higher or lower than the input voltage. However, while switch-mode power supplies generally exhibit high efficiency, these power supplies also generate substantial noise and ripple in the output voltage.

Some switch-mode power supplies use a single inductor to supply multiple output voltages from a battery or other voltage source. These switch-mode power supplies are commonly referred to as single-inductor, multiple output (SIMO) supplies. Conventional SIMO supplies undesirably require a complex central controller that must not only regulate a bias voltage necessary to generate each of the output voltages, but must also provide different sets of timing signals to control the switching required to generate each individual output voltage.

Linear regulators have also been used to stabilize the voltages provided to electronic circuits. However, while linear regulators typically provide output voltages that exhibit less noise than switch-mode power supplies, linear regulators are typically much less efficient than switch-mode power supplies. The efficiency of any regulator, expressed as a percentage, is expressed as the output power/input power×100%.

Low dropout linear voltage regulators (LDOs) are capable of generating an output voltage in response to an input voltage provided by a battery or other power source, wherein the output voltage is always less than the input voltage. Conventional LDOs have been directly connected to a battery for powering circuits operating at voltages lower than the minimum battery voltage. To provide an output voltage higher than the minimum battery voltage, a boost regulator has been used to generate a voltage greater than the maximum battery voltage. The boosted voltage is then used to power the LDO, such that the output voltage provided by the LDO is greater than the battery voltage. However, both of these schemes are very inefficient, unless the output voltage of the LDO regulator happens to be very close to the input voltage of the LDO.

It would therefore be desirable to have an improved power supply that exhibits the high efficiencies associated with switch-mode power supplies, and the low output noise associated with linear regulators.

It would further be desirable for such an improved power supply to be able to generate multiple output voltages, without requiring a complex controller.

It would also be desirable for such an improved power supply to be able to provide multiple output voltages, some greater than and some less than the battery voltage.

It would also be desirable for such an improved power supply to be able to simultaneously provide multiple positive voltages and also multiple negative voltages from a single input voltage.

SUMMARY

Accordingly, the present invention provides a Controlled Headroom Low Dropout Regulator (CHLDO) that includes a conventional LDO with an input voltage provided by a current source feeding a capacitor. A small incremental voltage is added to the output voltage of the LDO to create a floating reference voltage. The reference voltage is compared to the capacitor voltage to determine when to couple the capacitor to the current source, and when to de-couple the capacitor from the current source. When the capacitor is coupled to the current source, the capacitor will charge only if the voltage at the current source exceeds the input voltage provided by the capacitor. When the input voltage developed on the capacitor exceeds the reference voltage, the capacitor is automatically decoupled from the current source. Multiple CHLDOs can be charged from a single current source, wherein charging automatically proceeds from the CHLDO whose voltage is closest to ground to the CHLDO whose voltage is farthest from ground.

In one embodiment, the current source includes a single inductor, which is charged and discharged during different phases of a pulse width modulation (PWM) signal. The current source may operate in a Buck (or forward) configuration, a Boost (or flyback) configuration or a Buck-Boost configuration in different embodiments. In various embodiments, the CHLDO may be synchronized to the PWM's clock (clocked) or not synchronized (un-clocked). Other embodiments may be used as well.

In a dual polarity embodiment, one terminal of an inductor (I_POS) is used to supply CHLDOs that provide positive output voltages, while the other terminal of the inductor (I_NEG) is simultaneously used to supply CHLDOs that provide negative output voltages.

The current source also delivers energy to one or more regulated bias voltages by charging capacitors directly from the final inductor current discharge. A positive bias voltage (V_POS) is provided to each of the CHLDOs that generate positive output voltages, and a negative bias voltage (V_NEG) is provided to each of the CHLDOs that generate negative output voltages, wherein these bias voltages are also used to supply power to the corresponding positive and negative reference voltages within the CHLDOs.

The present invention will be more fully understood in view of the following description and drawings.

DETAILED DESCRIPTION

In general, the present invention provides a controlled headroom low dropout regulator (CHLDO) that includes circuitry to maximize the efficiency of a linear regulator, such as a low dropout regulator (LDO), by maintaining a very small voltage difference between the input and output terminals of the linear regulator. The CHLDO of the present invention can passively draw power from a continuous mode or discontinuous mode current source, without the need for any interactive control methodology. In alternate embodiments of the present invention, the CHLDO may either be un-clocked or clocked. The un-clocked CHLDO, which does not operate directly in response to a clock signal, does not require that any data be passed to or from the associated current source. The clocked CHLDO is enabled by and operates in synchronism with the same clock signal used to control an associated PWM current source. Thus, the clocked CHLDO of the present invention includes an additional input terminal to receive the associated clock signal.

One example of a discontinuous current source that can be used to supply the CHLDO of the present invention is a single-inductor switch-mode power supply, which supplies current during the time when the inductor is in a current discharge mode. In one embodiment, the control loop of this single-inductor switch-mode power supply uses conventional current mode control to provide for simple control loop stabilization and limit peak inrush current.

In accordance with various embodiments, the single-inductor switch-mode power supply can have a Buck configuration, a Buck-Boost configuration or a Boost configuration. As described in more detail below, multiple CHLDOs can be efficiently and reliably supplied from one single-inductor single switch-mode power supply. Moreover, these multiple CHLDOs can provide both positive and negative output voltages in response to a single-inductor switch-mode power supply.

The present invention can be incorporated, for example, in power management ICs as used in portable and handheld devices such as cell phones, handheld games, PDAs and GSM devices as well as larger devices such as computers, gaming systems and set top boxes.

Un-Clocked CHLDO Operation

Figure 1A:
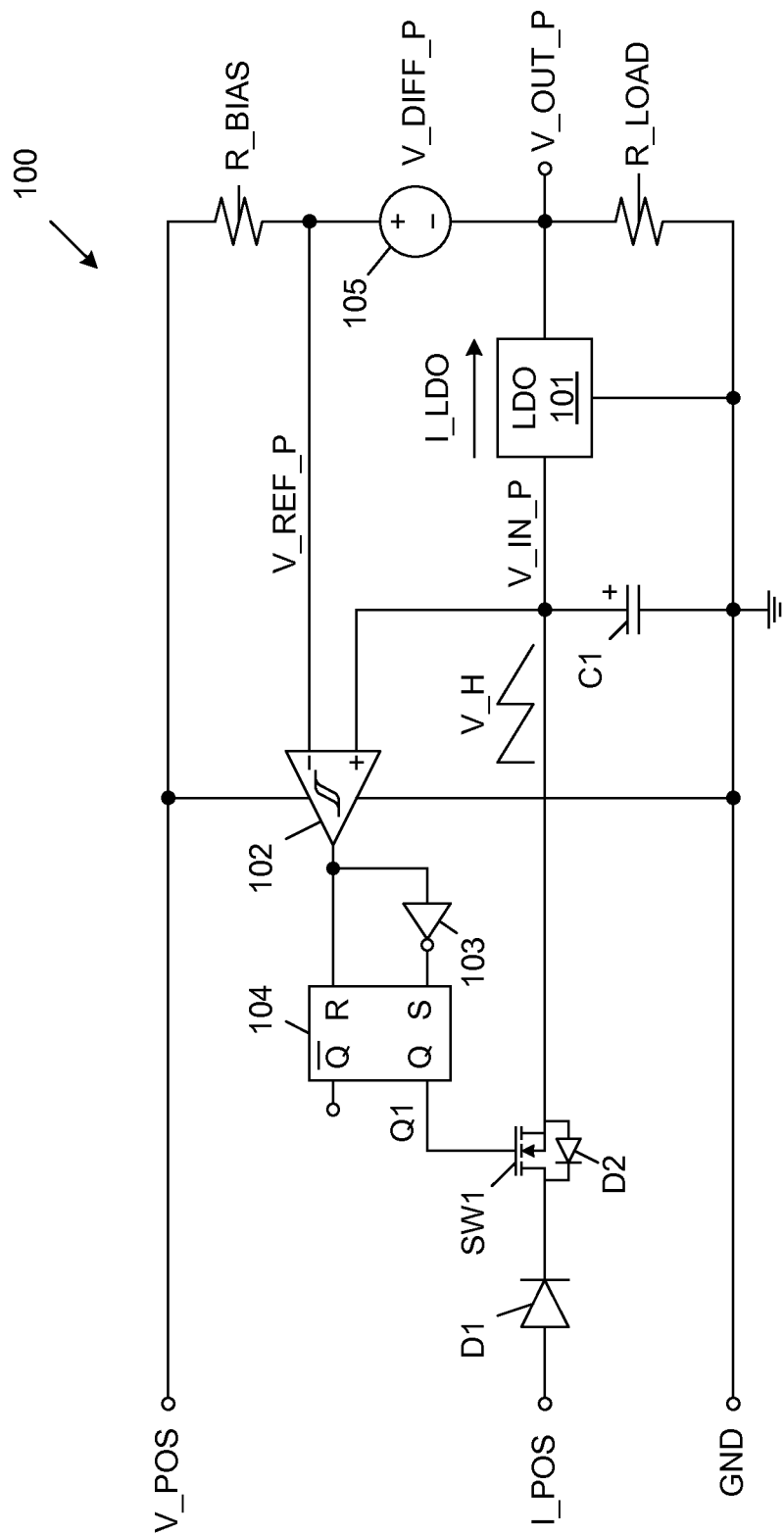
FIGS. 1A and 1B are circuit diagrams of positive voltage un-clocked controlled headroom low dropout regulators (CHLDOs) in accordance with alternate embodiments of the present invention.

FIG. 1A is a circuit diagram of an un-clocked controlled headroom low dropout regulator (CHLDO) 100 in accordance with one embodiment of the present invention. Un-clocked CHLDO 100 includes input terminals V_POS, I_POS and GND, output terminal V_OUT_P, rectifiers (diodes) D1-D2, switching transistor SW1, capacitor C1, load resistor R_LOAD, bias resistor R_BIAS, low dropout regulator (LDO) 101, comparator 102, inverter 103, reset-set (R-S) flip-flop 104, and voltage source 105.

During normal operation of CHLDO 100, the input terminal I_POS is coupled to receive a current from a current source. As described in more detail below, this current source may be a switch-mode current source having a Buck, Buck-Boost or Boost controller type. The switch-mode current source supplies energy through the reverse-blocking rectifier D1 to switch SW1. As described in more detail below, switch SW1 selectively passes energy into capacitor C1 in response to a control signal Q1 provided by R-S flip-flop 104. The energy stored by capacitor C1 is provided to the input terminal of LDO 101. The voltage developed on the input terminal of LDO 101 is labeled as the input voltage V_IN_P. LDO 101 is a conventional LDO circuit, well known to those of ordinary skill in the art.

LDO 101 provides a constant output voltage V_OUT_P in response to the input voltage V_IN_P (and the ground supply voltage GND). The output voltage V_OUT_P delivers power to load resistor R_LOAD. The current through LDO 101 is labeled I_LDO in the described embodiments. LDO 101 operates at a high efficiency as long as the input voltage V_IN_P exceeds the output voltage V_OUT_P by only a very small dropout voltage across LDO 101.

During normal un-clocked operation of CHLDO 100, the input terminal V_POS is coupled to receive a voltage from the switch-mode voltage source. This V_POS bias voltage must be greater than the output voltage V_OUT_P, and is used to power the front-end circuitry of CHLDO 100, including, for example, comparator 102. The bias voltage V_POS is also applied to bias resistor R_BIAS. Reference voltage source 105 develops a constant voltage difference V_DIFF_P across its terminals in response to the current coming from V_POS through the bias resistor R_BIAS, which passes through to the output voltage V_OUT_P. In the described embodiment, the voltage difference V_DIFF_P is about 0.3 Volts.

Figure 1B:
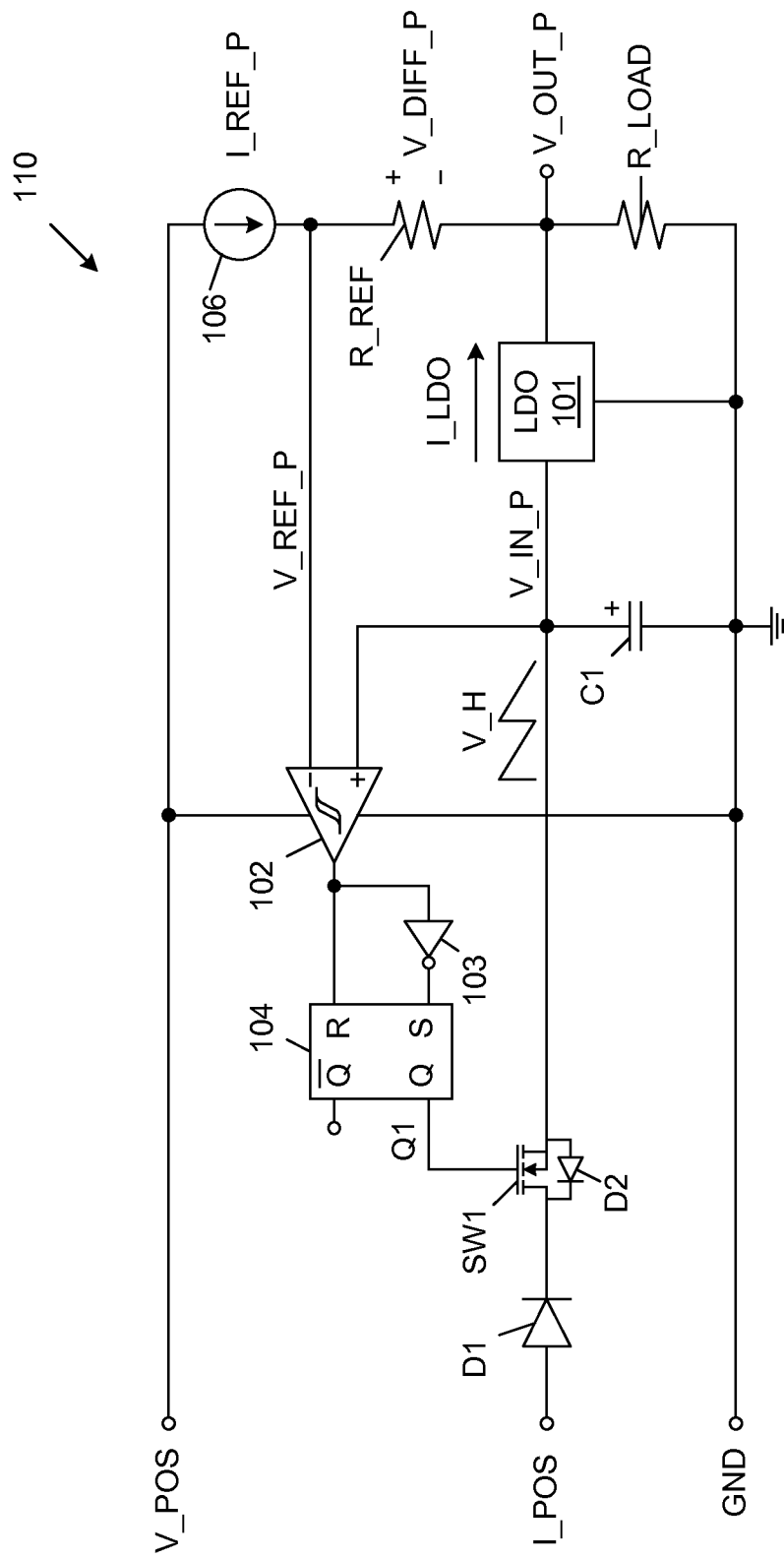

FIG. 1B is a circuit diagram of an un-clocked controlled headroom low dropout regulator (CHLDO) 110 in accordance with an alternate embodiment of the present invention. The CHLDO 110 of FIG. 1B replaces the bias resistor R_BIAS and the reference voltage source 105 of the CHLDO 100 (FIG. 1A) with a reference current source 106 and a reference resistor R_REF, respectively. In this alternate embodiment, the current I_REF_P provided by current source 106 results in a voltage drop of V_DIFF_P (e.g., 0.3 Volts) across the resistor R_REF.

Within CHLDOs 100 and 110, a reference voltage V_REF_P equal to V_OUT_P+V_DIFF_P is applied to the negative input terminal of comparator 102. The positive input terminal of comparator 102 is coupled to receive the input voltage V_IN_P applied to LDO 101.

Comparator 102 is designed to exhibit hysteresis, which means that comparator 102 will exhibit different switching voltages for rising and falling transitions of the differential input signal represented by V_IN_P and V_REF. For example, the output signal provided by comparator 102 may switch to a logic high state when the input voltage V_IN_P exceeds the reference voltage V_REF_P. However, the output signal provided by comparator 102 may switch to a logic low state when the input voltage V_IN_P becomes less than the reference voltage V_REF_P by a hysteresis voltage V_H introduced by comparator 102.

CHLDO 100/110 operates as follows in accordance with one embodiment of the present invention. Initially, the input voltage V_IN_P of LDO 101 is equal to the output voltage V_OUT_P of LDO 101, such that the output of comparator 102 is low. Note that the voltage V_DIFF_P is selected to be large enough to ensure that the output of comparator 102 is driven low under these conditions (i.e., V_DIFF_P is greater than V_H). The low output of comparator 102 is inverted by inverter 103, thereby applying a logic high voltage to the set input terminal (S) of R-S flip-flop 104. In response, the Q output of flip-flop 104 (i.e., the switch control signal Q1) is set to a logic high state, thereby turning on switch SW1. Under these conditions, current provided from input terminal I_POS passes through rectifier D1 and switch SW1 to capacitor C1. As a result, capacitor C1 charges, thereby causing the input voltage V_IN_P to increase.

When the input voltage V_IN_P becomes greater than the reference voltage V_REF_P, the output of comparator 102 toggles to a logic high state. The logic high output of comparator 102 is applied to the reset terminal (R) of flip-flop 104 (and the set terminal (S) is simultaneously driven to a low state). In response, the Q output of flip-flop 104 (i.e., Q1) is reset to a logic low state, thereby turning off switch SW1. Under these conditions, current flow from the input terminal I_POS to capacitor C1 is stopped. At this time, capacitor C1 supplies energy to LDO 101. Capacitor C1 continues supplying energy to LDO 101 until the input voltage V_IN_P falls below a voltage of V_REF_P minus the hysteresis voltage V_H. At this time, the output of comparator 102 toggles to a logic low state, and the above-described cycle repeats.

The various circuit elements of CHLDO 100 are designed/sized such that the minimum expected value of the input voltage V_IN_P during normal operating conditions (i.e., V_OUT_P+V_DIFF_P−V_H−noise & transient voltages) is greater than the dropout voltage of LDO 101 with some margin to spare.

If CHLDO 100/110 is driven by a Buck converter (described below in connection with FIGS. 6A-6B and 12A-12C), the maximum ripple in the input voltage V_IN_P is determined by the hysteresis introduced by comparator 102 alone, but only if the output voltage V_OUT_P is less than the input voltage V_IN_P. That is, the maximum input ripple voltage is approximately equal to the hysteresis voltage V_H.

If CHLDO 100/110 is driven with a Boost converter (as described below in connection with FIGS. 7A-7B), a Buck-Boost converter (as described below in connection with FIGS. 3A-3B and 10A-10C), or a Buck converter where the particular output voltage V_OUT_P is greater than the input voltage V_IN_P, the maximum ripple in the input voltage V_IN_P is determined by the hysteresis introduced by comparator 102 and also by a delay that could occur before the next inductor discharge cycle begins. That is, the maximum input ripple voltage is approximately equal to the hysteresis voltage V_H plus the further discharge until the inductor next delivers energy.

If a pulsed current source, such as a Boost or Buck-Boost switch-mode power supply, is used to supply current to the input terminal I_POS, then it is possible that switch SW1 may be turned on while the current source is not supplying current to the input terminal I_POS. For example, during the charge portion of the PWM signal, the switch-mode power supply may enter a charge mode, during which no current is supplied to the input terminal I_POS. The switch-mode power supply may only discharge current to the input terminal I_POS during a discharge portion of the PWM cycle. In this case, the input voltage V_IN_P can continue to drop for an extended clock cycle delay after the switch SW1 is turned on. To compensate, the hysteresis voltage V_H can be selected to be approximately one half of the difference between the reference voltage V_REF_P and the minimum allowed input voltage (i.e., the dropout voltage) of LDO 101. This ensures that even under worst case conditions, the input voltage V_IN_P will not drop below the headroom voltage of LDO 101 while waiting for the next PWM cycle.

The various circuit elements of CHLDO 100 are also designed/sized such that the maximum expected value of the input voltage V_IN_P during normal operating conditions (i.e., V_OUT_P+V_DIFF_P) is close to the output voltage V_OUT_P of LDO 101, such that the efficiency of LDO 101 is maintained at a high value.

In one sample embodiment, the maximum expected value of the input voltage V_IN_P is about 2.8V, the minimum value is 2.7V and the output voltage V_OUT_P is about 2.5V, such that the efficiency of LDO 101 is maintained at about 89% at the ripple peak and 93% at the ripple minimum for an average efficiency of about 91%. Note that LDO 101 operates in a highly linear manner under these conditions.

The effective switching frequency of un-clocked CHLDO 100/110 is independent of the frequency of the PWM clock signal used to generate the current supplied to the input terminal I_POS. The effective switching frequency of un-clocked CHLDO 100/110 can be approximated by Equation 1.

$$f \approx \frac{I\_LDO}{C1 \times V\_H} \quad \text{(Equation 1)}$$

The effective switching frequency of an un-clocked CHLDO 100/110 can therefore be different than the operating frequency of a switch-mode power supply used to supply the un-clocked CHLDO 100/110.

Note that diode D2 is an inherent structure within switch SW1, due to the common connection between the drain and body region of switch SW1. Diode D2 necessitates the presence of rectifier D1, as diode D2 would undesirably allow reverse current flow from capacitor C1 to the terminal I_POS, were it not for the presence of rectifier D1. In an alternate embodiment, switch SW1 may be modified such that a common connection is selected between the source and body region (rather than the drain and body region) of switch SW1, such that the direction of the inherent diode structure D2 can be reversed as required. In this embodiment, it may be possible to eliminate rectifier diode D1.

It is desirable to use un-clocked CHLDO 100/110 to supply relatively light loads connected to the output voltage terminal V_OUT_P. Note that a discontinuous current source used to supply un-clocked CHLDO 100/110 will typically operate in response to a clock signal. As described in more detail below, this current source may charge and discharge an inductor during each cycle of a clock signal to generate the supply current. However, if un-clocked CHLDO 100/110 supplies a relatively light load, it may not be necessary to charge capacitor C1 during each cycle of the clock signal in order to properly supply the load. Un-clocked CHLDO 100/110 allows capacitor C1 to be charged only when necessary, independent of the clock signal used to generate the supply current. Thus, capacitor C1 may only be charged every N cycles of the power supply clock signal, wherein N is greater than 1. As a result, the power consumption of un-clocked CHLDO 100/110 (which is largely determined by the operation of switch SW1) is advantageously minimized. Note that because the un-clocked CHLDO 100/110 may not be charged during every cycle of the clock signal, it may be necessary to make capacitor C1 relatively large to ensure that the voltage V_IN_P of capacitor C1 does not drop to undesirably low levels under worst case charging conditions. In accordance with one embodiment, the capacitor C1 used in un-clocked CHLDO 100/110 is twice as large as a similar capacitor C1 used in a clocked CHLDO, which is described in more detail below.

Clocked CHLDO Operation

Figure 2:
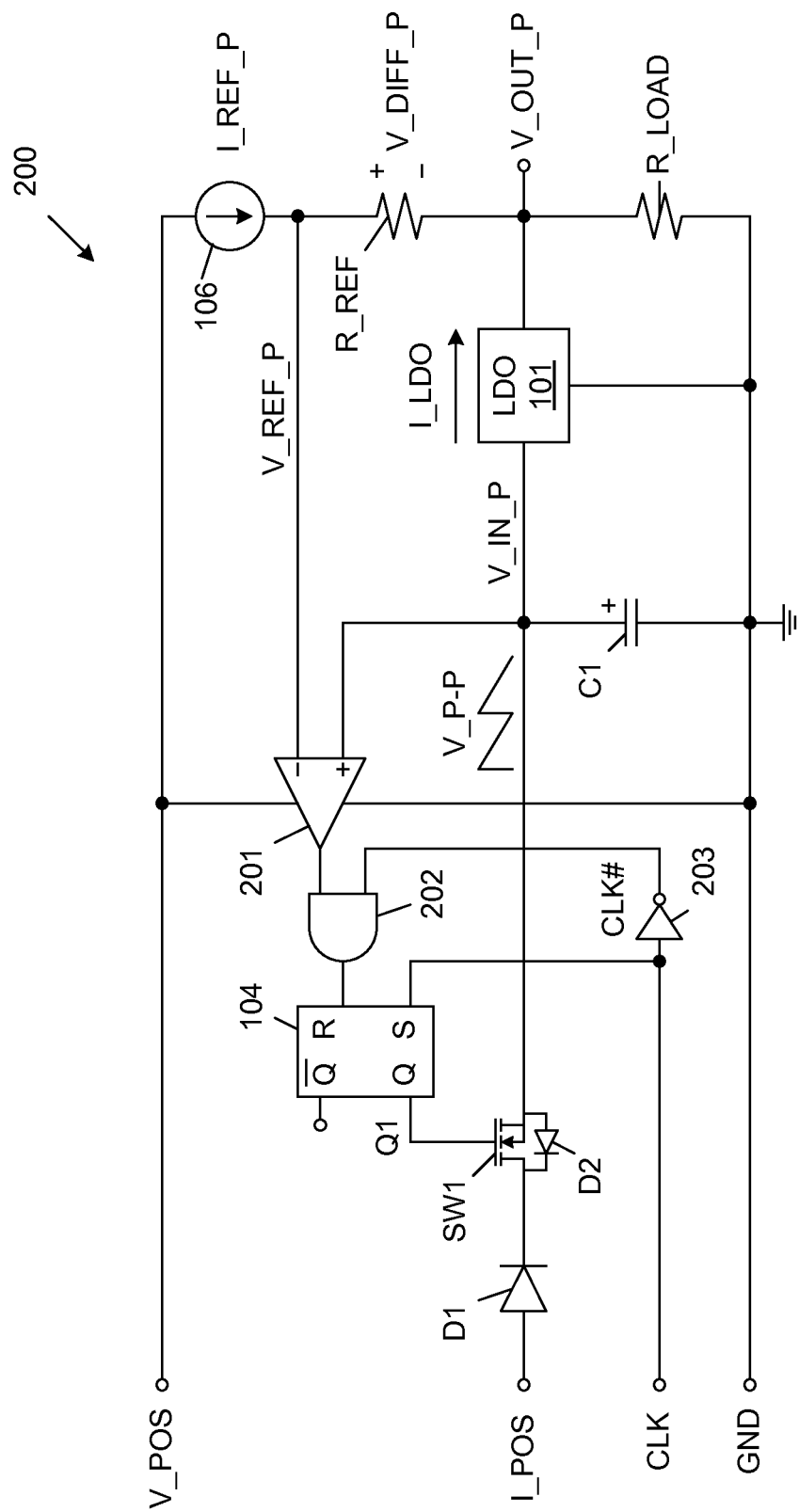
FIG. 2 is a circuit diagram of a positive voltage clocked CHLDO in accordance with an alternate embodiment of the present invention.

FIG. 2 is a circuit diagram of a clocked CHLDO 200 in accordance with an alternate embodiment of the present invention. Because clocked CHLDO 200 is similar to un-clocked CHLDO 110, similar elements are labeled with similar reference numbers in FIGS. 1B and 2. Thus, clocked CHLDO 200 includes input terminals V_POS, I_POS and GND, output terminal V_OUT_P, rectifiers D1-D2, switching transistor SW1, capacitor C1, load resistor R_LOAD, reference resistor R_REF, low dropout regulator (LDO) 101, reset-set (R-S) flip-flop 104, and reference current source 106, which are described above in connection with FIG. 1B. In an alternate embodiment, the reference resistor R_REF and the reference current source 106 of CHLDO 200 may be replaced with the voltage source 105 and the bias resistor R_BIAS, respectively, of CHLDO 100 (see, FIG. 1A).

Clocked CHLDO 200 replaces the comparator 102 of CHLDO 110 with comparator 201, wherein comparator 201 is not required to exhibit hysteresis. The output terminal of comparator 201 is coupled to an input terminal of logical AND gate 202.

Clocked CHLDO 200 also includes a clock input terminal CLK, which is coupled to receive a very narrow positive going clock pulse signal (CLK) from a switch-mode power supply. This received clock signal is synchronized with the clock signal used by the switch-mode power supply to generate the current supplied to the input terminal I_POS. In the described embodiments, the clock signal received on the clock input terminal CLK is the same clock signal used by the switch-mode power supply. For purposes of describing the present invention, it will be assumed that the switch-mode power supply enables a charge mode when the clock signal CLK transitions to a high state. The clock signal CLK is applied to the set (S) terminal of flip-flop 104. Inverter 203 provides the inverse of the clock signal (i.e., CLK#) to an input terminal of AND gate 202 (which temporarily blocks the output of comparator 201). The output terminal of AND gate 202 is coupled to the reset input terminal (R) of R-S flip-flop 104.

Clocked CHLDO 200 operates as follows in accordance with one embodiment of the present invention. Initially, the input voltage V_IN_P is equal to the output voltage V_OUT_P, such that comparator 201 provides a logic low output to AND gate 202. As specified above, the switch-mode power supply enters a charging mode in response to a low-to-high transition (rising edge) of the clock signal CLK. R-S flip-flop 104 is set in response to the rising edge of the clock signal CLK, such that the Q output of flip-flop 104 (i.e., Q1) is set to a logic high state, thereby turning on switch SW1.

If CHLDO 200 is driven by a Buck switch-mode power supply (described below in connection with FIGS. 6A-6B and 12A-12C), and the voltage on the input terminal I_POS is greater than the input voltage V_IN_P, then current can flow from the input terminal I_POS into capacitor C1 during both the inductor charging (and discharging) cycles of the Buck switch-mode power supply. However, if the voltage on the input terminal I_POS is less than the input voltage V_IN_P, then no current flows from the input terminal I_POS into capacitor C1 during the inductor charging cycle.

If CHLDO 200 is driven with a Boost switch-mode power supply (as described below in connection with FIGS. 7A-7B), or a Buck-Boost switch-mode power supply (as described below in connection with FIGS. 3A-3B and 10A-10C), then during the charge mode of the switch-mode power supply, the voltage on input terminal I_POS is pulled down toward ground, such that rectifier diode D1 is reverse biased by the positive input voltage V_IN_P. Thus, even though switch SW1 is turned on, no current flows through this switch SW1 during the inductor charging mode.

The switch-mode power supply subsequently enters a discharging mode. At this time, current flow in the switch-mode power supply's inductor drives the voltage on the input terminal I_POS higher. When the voltage applied to the input terminal I_POS becomes greater than the input voltage V_IN_P, capacitor C1 charges in the manner described above, thereby causing the input voltage V_IN_P to increase.

When the input voltage V_IN_P becomes greater than the reference voltage V_REF_P, the output of comparator 201 toggles to a logic high state. Note that the inverted clock signal CLK# also has a logic high state at this time (because the CLK signal is a narrow impulse signal that transitions to a logic low state immediately after transitioning to a logic high state). As a result, the output provided by AND gate 202 also toggles to a logic high state. The rising edge of the output signal provided by AND gate 202 is applied to the reset terminal (R) of flip-flop 104. In response, the Q output of R-S flip-flop 104 (i.e., Q1) is reset to a logic low state, thereby turning off switch SW1. Under these conditions, current flow from the input terminal I_POS to capacitor C1 is stopped, and capacitor C1 supplies energy to LDO 101. Capacitor C1 continues supplying energy to LDO 101 until the next low-to-high transition of the clock signal CLK. At this time, the above-described cycle repeats.

Within clocked CHLDO 200, the maximum ripple voltage (V_P-P) of the input voltage V_IN_P applied to the input terminal of LDO 101 is approximated by the value of the filter capacitor (C1) as shown in Equation 2, wherein f is the frequency of the clock signal CLK).

$$V\_P-P = \frac{I\_LDO}{f \times C1} \qquad \text{(Equation 2)}$$

The various circuit elements of clocked CHLDO 200 are designed/sized such that the minimum expected value of the input voltage V_IN_P during normal operating conditions (i.e., V_OUT_P+V_DIFF_P−V_P-P−noise & transient voltages) is greater than the dropout voltage of LDO 101.

The various circuit elements of CHLDO 200 are also designed/sized such that the maximum expected value of the input voltage V_IN_P during normal operating conditions (i.e., V_OUT_P+V_DIFF_P) is close to the output voltage V_OUT_P of LDO 101, such that the efficiency of LDO 101 is maintained at a high value.

In one sample embodiment, the maximum expected value of the input voltage V_IN_P is about 2.8V, the minimum value is 2.7V and V_OUT_P is about 2.5V, such that the efficiency of LDO 101 is maintained at about 89% at the ripple peak and 93% at the ripple minimum for an average efficiency of about 91%. Note that LDO 101 operates in a highly linear manner under these conditions.

Note that CHLDOs 100, 110 and 200 provide improved operating conditions with respect to conventional LDOs in the event that the output terminal V_OUT_P is shorted to ground. If the output terminal of a conventional LDO were pulled down to ground, a significant voltage difference would continue to exist between the input terminal V_IN_P and the output terminal V_OUT_P of the LDO, because the input terminal V_IN_P would continue to be charged to its full input voltage. However, in CHLDO 100/110/200 of the present invention, if the output terminal V_OUT_P is shorted to ground, then the capacitor C1 will only charge to a voltage approximately equal to the voltage V_DIFF_P (e.g., about 0.3 Volts). As a result, energy consumption within the CHLDO 100/110/200 is greatly reduced with respect to a conventional LDO under these conditions.

Figure 3A:
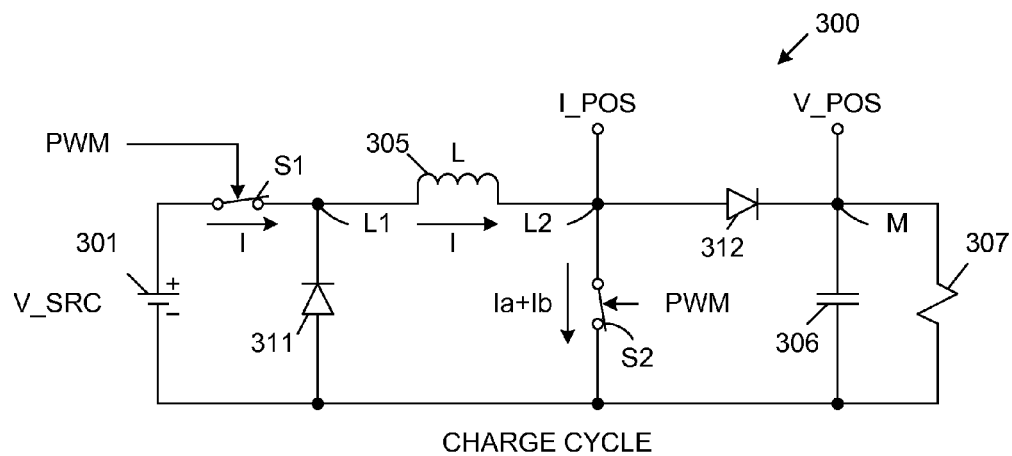
FIGS. 3A and 3B are circuit diagrams that illustrate charge and discharge cycles, respectively, of a positive output switch-mode power supply having a Buck-Boost controller type, which is used to power the CHLDOs of FIGS. 1A/1B and FIG. 2 in accordance with one embodiment of the present invention.
Figure 3B:
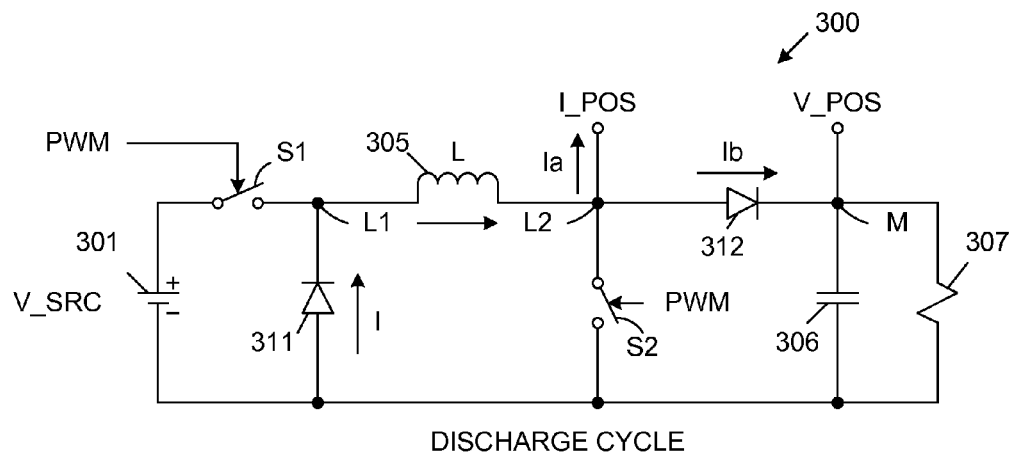

FIGS. 3A and 3B are circuit diagrams that illustrate charge and discharge cycles, respectively, of a switch-mode power supply 300 having a Buck-Boost controller type, which can be used to power the CHLDOs 100/110/200 of FIGS. 1A/1B and FIG. 2 in accordance with one embodiment of the present invention. Switch-mode power supply 300 can supply CHLDOs having output voltage magnitudes (V_OUT_P) less than or greater than the power source voltage V_SRC. The output voltage V_OUT_P of each of the supplied CHLDOs must be less than the bias voltage V_POS. Switch-mode power supply 300 includes switches S1-S2, power source 301, a single inductor 305, capacitor 306, resistor 307 (which approximates the total load on V_POS) and rectifiers 311-312, which are connected as illustrated. In the described examples, power source 301 is a Li-Ion battery, although other types of batteries or power sources can be used in other embodiments. Power source 301 provides a positive voltage V_SRC to switch S1. Inductor 305 has a first terminal L1 coupled to switch S1, and a second terminal L2 coupled to the input terminal I_POS of the associated CHLDO(s) (e.g., un-clocked CHLDO 100/110 and/or clocked CHLDO 200). Switch S2 is coupled between inductor terminal L2 and the negative (−) terminal of power source 301. Rectifier 312 has an input terminal coupled to the inductor terminal L2, and an output terminal M coupled to the input terminal V_POS of the associated CHLDO(s). Capacitor 306 and resistor 307 are connected in parallel between the output terminal M and the negative terminal of battery 301. As described in more detail below, capacitor 306 supplies the required bias voltage V_POS to the attached CHLDO(s).

Switch S1 operates in response to an input signal PWM which is in synchronization with the clock signal CLK. In the described embodiments, switches S1 and S2 close as illustrated in FIG. 3A when the signal PWM transitions to a logic high state, thereby initiating a charge cycle of the switch-mode power supply 300. Conversely, switches S1 and S2 open as illustrated in FIG. 3B when the signal PWM transitions to a logic low state, thereby initiating a discharge cycle of the switch-mode power supply 300. In the described embodiments, the rising edges of the PWM and CLK signals are synchronized, but the falling edge of the CLK signal occurs sooner than the falling edge of the PWM signal.

In accordance with one embodiment of the present invention, switch-mode power supply 300 can power a single associated CHLDO or multiple associated CHLDOs.

Figure 4:
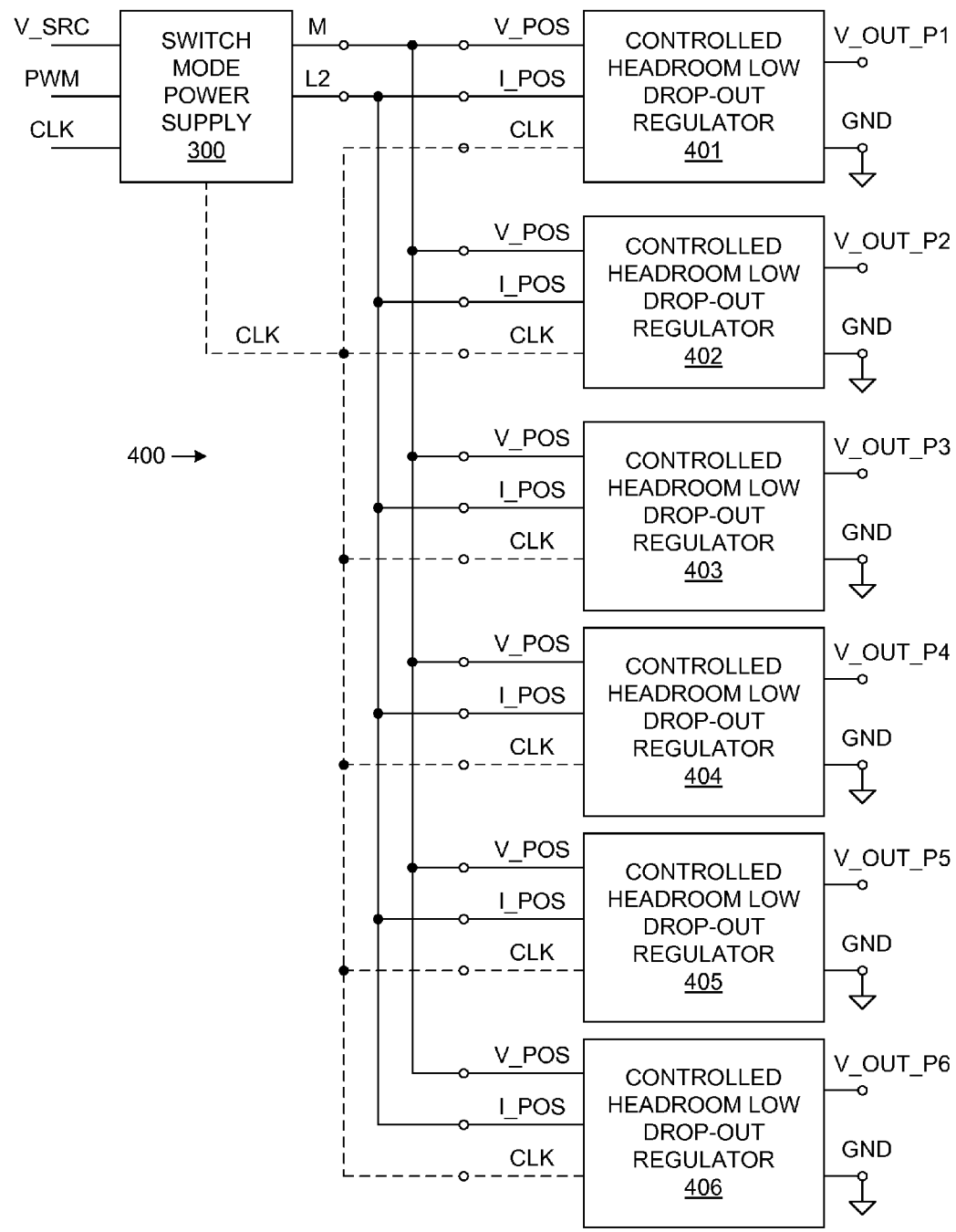
FIG. 4 is a block diagram of a positive output power supply system, which includes multiple CHLDOs coupled to the switch-mode power supply of FIGS. 3A and 3B in accordance with one embodiment of the present invention.

FIG. 4 is a block diagram of a single-inductor, multiple output (SIMO) power supply system 400, which includes six positive output CHLDOs 401-406 connected to switch-mode power supply 300. In accordance with one embodiment, CHLDOs 401-406 may all be un-clocked CHLDOs, similar to CHLDO 100/110 (FIGS. 1A-1B). In accordance with another embodiment, CHLDOs 401-406 may all be clocked CHLDOs, similar to CHLDO 200 (FIG. 2). In yet another embodiment, one or more of CHLDOs 401-406 may be un-clocked CHLDOs, while one or more of CHLDOs 401-406 are clocked CHLDOs. Note that any clocked CHLDOs would receive the clock signal CLK, which has been described above. CHLDOs 401-406 are configured to provide six different output voltages V_OUT_P1 to V_OUT_P6, respectively. In accordance with one embodiment, these output voltages may all be positive output voltages, wherein V_OUT_P6>V_OUT_P5>V_OUT_P4>V_OUT_P3>V_OUT_P2>V_OUT_P1>0. Although six CHLDOs 401-406 are illustrated in FIG. 4, it is understood that other numbers of CHLDOs may be supplied from switch-mode power supply 300 in other embodiments.

Returning now to FIG. 3A, switch-mode power supply 300 operates as follows in accordance with one embodiment of the present invention. Switches S1 and S2 are initially turned on in response to a rising edge of the signal PWM (which is synchronized with a rising edge of the clock signal CLK), thereby initiating a charge cycle as illustrated by FIG. 3A. Under these conditions, current I (I=Ia+Ib) flows from the power source 301 through switch S1, inductor 305 and switch SW2. As a result, inductor 305 is charged from power source 301. As described above, the switch SW1 within each CHLDO supplied from switch-mode power supply 300 is also turned on in response to the rising edge of the clock signal CLK. The voltage on the second terminal L2 of inductor 305 is pulled down toward ground through switch SW2 during the inductor charge cycle. As a result, the rectifier diodes D1 within the positive voltage CHLDOs 401-406 are reverse biased, because the voltage applied to the input terminal I_POS of each CHLDO is less than the input voltages V_IN_P within each of these CHLDOs.

At the end of the inductor charge cycle, switches S1 and S2 are turned off in response to a falling edge of the signal PWM. At this time, inductor terminal L1 tries to drive negative, but the inductor current is 'caught' through rectifier 311 into ground. Also at this time, inductor terminal L2 tries to drive positive, but is stopped because the current through inductor 305 is 'caught' by the attached CHLDO having the lowest positive output voltage. For example, if V_OUT_P6>V_OUT_P5>V_OUT_P4>V_OUT_P3>V_OUT_P2>V_OUT_P1>0, then the current from inductor 305 is initially 'caught' by CHLDO 401. The CHLDO having the lowest positive output voltage V_OUT_P draws off energy from inductor 305, until the input voltage V_IN_P of the associated capacitor C1 exceeds the corresponding reference voltage V_REF_P, thereby causing the associated switch SW1 to turn off in the manner described above in connection with FIGS. 1A, 1B and 2.

Note that the CHLDOs having higher output voltages V_OUT_P (e.g., CHLDOs 402-406 in the present example) do not draw energy from inductor 305 at this time, because the voltage on the input terminal I_POS remains below the corresponding input voltages V_IN_P of these higher voltage CHLDOs. As a result, the rectifier diodes D1 within these higher voltage CHLDOs remain reverse biased.

This process is completed within each of the CHLDOs supplied from switch-mode power supply 300, from the CHLDO having the lowest output voltage to the CHLDO having the highest output voltage. That is, each CHLDO 'catches' the inductor current, and then turns off its corresponding switch SW1 when the input voltage V_IN_P provided by the associated capacitor C1 reaches its upper threshold voltage.

After all of the capacitors C1 in all of the attached CHLDOs have been charged, any remaining energy in inductor 305 is dumped into terminal M through rectifier 312. Capacitor 306 is charged to provide the desired bias voltage V_POS on terminal M (and thereby on the V_POS input terminals of the attached CHLDOs). A current-mode control loop (not shown) controls the current threshold of inductor 305 to have an energy value sufficient to provide power to support all attached CHLDOs (including switching and headroom losses), and also provide the desired bias voltage V_POS.

Figure 5:
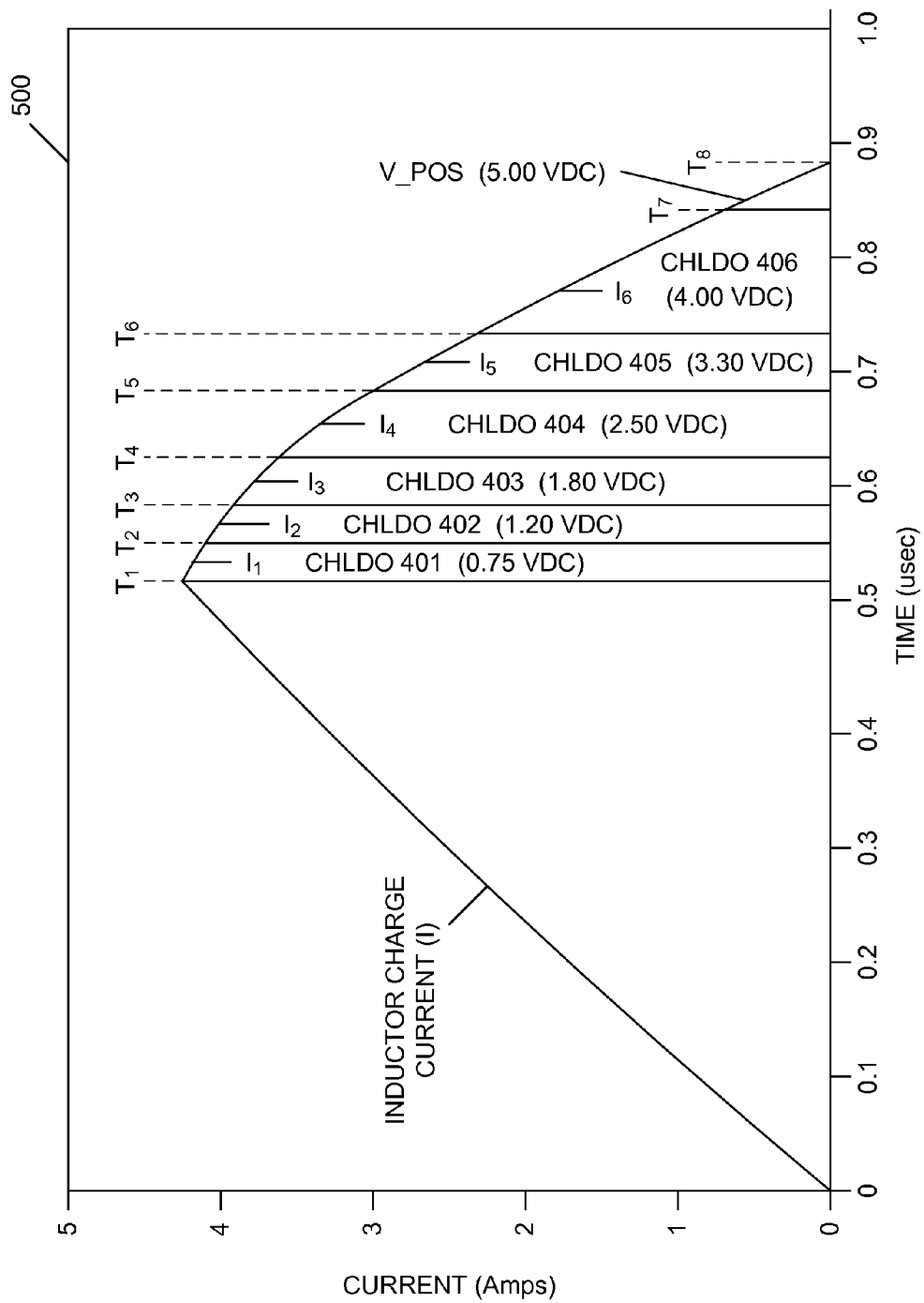
FIG. 5 is a waveform diagram illustrating currents through the positive output switch-mode power supply and multiple CHLDOs of FIG. 4 during a charge cycle and a discharge cycle, in accordance with one embodiment of the present invention.

FIG. 5 is a waveform diagram 500 illustrating the current (Ia+Ib) through inductor 305 during the charge cycle (Time=0 to T1) and the discharge cycle (Time=T1-T8) in accordance with one embodiment of the present invention. In this example, CHLDOs 401, 402, 403, 404, 405 and 406 have output voltages V_OUT_P1, V_OUT_P2, V_OUT_P3, V_OUT_P4, V_OUT_P5 and V_OUT_P6 equal to 0.75 Volts, 1.2 Volts, 1.80 Volts, 2.50 Volts, 3.3 Volts and 4.0 Volts, respectively. The bias voltage V_POS has a voltage of 5.00 Volts in the illustrated embodiment. FIG. 5 also illustrates the currents that charge the capacitors C1 within CHLDOs 401-406, which are labeled $I_1$-$I_6$, respectively.

At time T=0, the PWM signal (and the clock signal CLK) transitions to a logic high state, and inductor 305 begins charging. At time T1, the PWM signal transitions to a logic low state and inductor 305 begins discharging through the CHLDO having the lowest designated output voltage. In the described example, CHLDO 401 has the lowest designated output voltage (i.e., 0.75 Volts). Inductor 305 drives the voltage on inductor terminal L2 to a level sufficient to induce a charging current $I_1$ to flow into the charging capacitor C1 in CHLDO 401 (i.e., a voltage slightly above 0.75 Volts, but below 1.2 Volts). As a result, the charging current $I_1$ within CHLDO 401 increases from zero to the level of the inductor current 305 at time T1. At time T2, the input voltage V_IN_P of the capacitor C1 within CHLDO 401 has been charged to the predetermined voltage of V_OUT_P1+V_DIFF_P, thereby causing the switch SW1 within CHLDO 401 to be turned off in the manner described above. At this time (T2), the charging current $I_1$ within CHLDO 401 is reduced to zero.

Also at time T2, the inductor 305 begins discharging through the CHLDO having the next higher designated output voltage. In the described example, CHLDO 402 has the next higher designated output voltage (i.e., 1.2 Volts). Inductor 305 drives the voltage on inductor terminal L2 to a level sufficient to induce a charging current $I_2$ to flow into the charging capacitor C1 within CHLDO 402 (i.e., a voltage slightly above 1.2 Volts, but below 1.8 Volts). As a result, the charging current $I_2$ within CHLDO 402 increases from zero to the level of the inductor current 305 at time T2. At time T3, the input voltage V_IN_P of the capacitor C1 within CHLDO 402 has been charged to the predetermined voltage V_OUT_P2+V_DIFF_P, thereby causing the switch SW1 within CHLDO 402 to be turned off in the manner described above. At this time (T3), the charging current $I_2$ within CHLDO 402 is reduced to zero.

As illustrated in FIG. 5, this process repeats, wherein the capacitors C1 in the remaining CHLDOs 403-406 are sequentially charged by charging currents $I_3$-$I_6$, respectively. In the illustrated embodiment, the charge period (T6 to T7) of the capacitor C1 in the highest voltage CHLDO 406 is relatively long compared to the charge periods of the lower voltage CHLDOs 401-405. In accordance with one embodiment, the charge period associated with the highest voltage CHLDO 406 can be lengthened by using a charge capacitor C1 having a relatively high capacitance. For example, CHLDOs 401-405 include charging capacitors C1 having a capacitance of 1.0 micro-Farads, then CHLDO 406 may include a charging capacitor C1 having a capacitance of 2 micro-farads.

The voltages of the CHLDOs 401-406 in the example of FIG. 5 were deliberately chosen to prevent simultaneous current in two CHLDOs, for purposes of clarity. However, it is possible for two or more of the CHLDOs 401-406 to have the same voltage, and draw simultaneous parallel currents from the inductor, wherein each of these parallel currents is equal to the inductor current divided by the number of CHLDOs having the same voltage.

Capacitor 306 within switch-mode power supply 300 is charged from inductor 305 after the highest voltage CHLDO has been charged. Thus, in the example of FIG. 5, capacitor 306 is charged to a voltage of about 5.0 Volts during time period from T7 to T8. The current control loop (not shown) within switch-mode power supply 300 monitors the voltage V_POS on the terminal M to ensure that the required bias voltage V_POS is maintained. If necessary, this current control loop will increase the energy stored by inductor 305 (by increasing the inductor charging current), in order to ensure that sufficient energy is provided to maintain the bias voltage V_POS at the desired level.

In this manner, several CHLDOs may be supplied from a single inductor 305, as long as the energy supplied by the inductor during each cycle is sufficient to power to all of the CHLDOs and maintain the specified bias voltage V_POS.

Care should be taken to control load transitions of the CHLDOs 401-406 being supplied from the switch-mode power supply 300. In the case of a large step increase in power output at any CHLDO, the effects of insufficient inductor energy will always appear at the end of each discharge cycle as a voltage reduction in the V_POS output and possibly also a voltage reduction of the output voltage V_OUT_P of the highest voltage CHLDO output as well. For this reason, the higher voltage CHLDOs may need much larger input capacitors C1 to maintain the associated input voltages V_IN_P during the time it takes the current control loop to recover the energy level of the inductor 305 to the required level. In the case of a large step decrease in power output from any CHLDO, again the effects of left over inductor energy will always appear at the end of each discharge cycle as a voltage increase in the V_POS output alone. If this overshoot is severe, the higher voltage CHLDOs may be affected during the clock cycles that follow until the current control loop catches up.

SIMO power supply system 400 advantageously allows the attached CHLDOs 401-406 to be automatically supplied without a complex control scheme. That is, discrete switch timing does not need to be calculated and applied to each of the CHLDOs, as is required by the prior art. New output voltages may be added to SIMO power supply system 400 simply by modifying or adding a CHLDO. As described above, the switch-mode power supply 300 will automatically charge the new/modified CHLDO to provide the desired output voltage. This is a stark contrast to conventional systems, which require complex calculations to modify switch timing to modify or add output voltages.

Although SIMO power supply system 400 has been described in connection with the use of switch-mode power supply 300 (which includes a Buck-Boost controller type), it is understood that switch-mode power supply 300 can be replaced with other types of switch-mode power supplies in other embodiments. Several other switch-mode power supplies capable of replacing switch-mode power supply 300 will now be described.

Figure 6A:
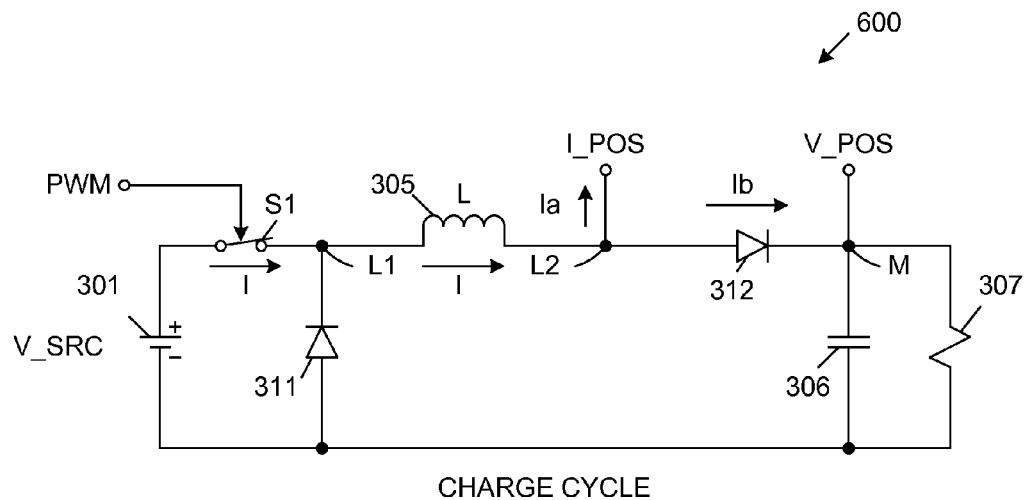
FIGS. 6A and 6B are circuit diagrams that illustrate charge and discharge cycles, respectively, of a positive output switch-mode power supply having a Buck controller type, which is used to power the CHLDOs of FIGS. 1, 2 and 4 in accordance with one embodiment of the present invention.
Figure 6B:
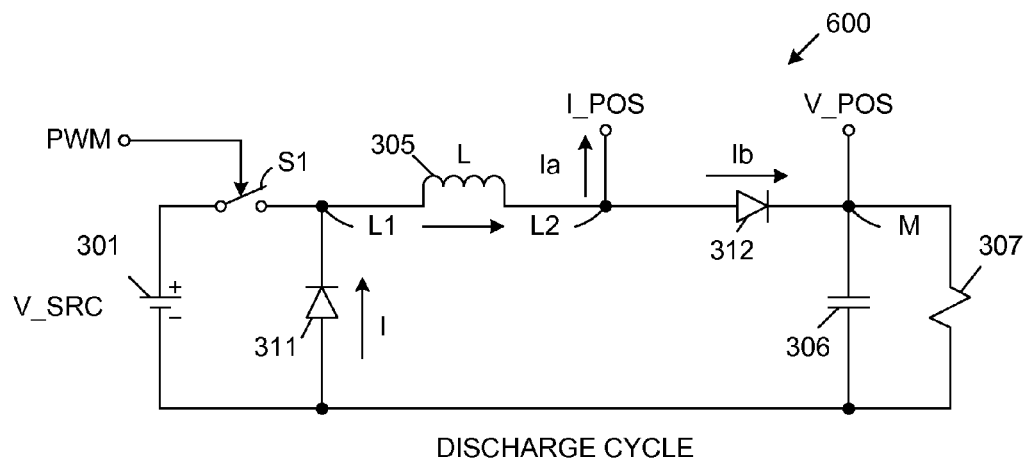

FIGS. 6A and 6B are circuit diagrams that illustrate charge and discharge cycles, respectively, of a switch-mode power supply 600 having a Buck controller type, which can be used to power the CHLDOs of FIGS. 1A, 1B, 2 and 4 in accordance with an alternate embodiment of the present invention. Switch-mode power supply 600 can supply CHLDOs having output voltages both less than and greater than the power source voltage V_SRC. However, the output voltages of each of the supplied CHLDOs must still be less than the bias voltage V_POS. Because switch-mode power supply 600 is similar to switch-mode power supply 300, similar elements in FIGS. 3A-3B and 6A-6B are labeled with similar reference numbers. Switch-mode power supply 600 does not include the switch S2 of switch-mode power supply 300. In the described embodiments, switch S1 closes as illustrated in FIG. 6A when the PWM signal transitions to a logic high state, thereby initiating a charge cycle of the switch-mode power supply 600. Conversely, switch S1 opens as illustrated in FIG. 6B when the PWM signal transitions to a logic low state, thereby initiating a discharge cycle of the switch-mode power supply 600.

Switch-mode power supply 600 operates as follows in accordance with one embodiment of the present invention. Switch S1 is initially turned on in response to a rising edge of the PWM signal, thereby initiating a charge cycle as illustrated by FIG. 6A. Under these conditions, current (I) flows from the power source 301 through switch SW1 and inductor 305. Current Ia flows to the I_POS input terminal of the associated CHLDO(s), and current Ib flows through rectifier 312 to the V_POS input terminal of the associated CHLDO(s), wherein I=Ia+Ib. As a result, inductor 305 is charged from battery 301. The voltage on the second terminal L2 of inductor 305 is immediately pulled up during the inductor charge cycle. As described above, the switch SW1 within each CHLDO supplied from switch-mode power supply 600 is also turned on during the inductor charge cycle. Under these conditions, the voltage on the second terminal L2 of inductor 305 rises to a voltage sufficient to forward bias the rectifier diode D1 within the lowest voltage CHLDO (e.g., CHLDO 401). Thus, the lowest voltage CHLDO begins charging during the inductor charge cycle. Note that the voltage on the second terminal L2 of inductor 305 is insufficient to forward bias the rectifier diodes D1 of the higher voltage CHLDOs (e.g., CHLDOs 402-406) at this time. As a result, no current flows through the rectifier diodes D1 of these higher voltage CHLDOs until each lower voltage CHLDO is charged. The CHLDO 401 having the lowest positive output voltage V_OUT_P draws off energy from inductor 305, until the input voltage V_IN_P of the associated capacitor C1 exceeds the corresponding reference voltage V_REF_P, thereby causing the associated switch SW1 to turn off in the manner described above in connection with FIGS. 1A-1B and 2. Current will flow into each of the CHLDOs 401-406 in sequence, from the lowest voltage CHLDO toward the highest voltage CHLDO, during the charge cycle of the inductor 305. However, only those CHLDOs having an input voltage V_IN_P less than the power source voltage V_SRC may charge during the charge cycle of the inductor 305 (because the rectifiers D1 in CHLDOs having an input voltage V_IN_P greater than the power source voltage V_SRC are reversed biased during the charge cycle). Those CHLDOs having an input voltage V_IN_P greater than the power source voltage V_SRC will be charged during the discharge cycle of the inductor 305, as described below.

At the end of the inductor charge cycle, switch S1 is turned off in response to a falling edge of the PWM signal. At this time, inductor terminal L1 tries to drive negative, but the inductor current is 'caught' through rectifier 311 into ground. Also at this time, the inductor terminal L2 (which has been feeding the lower voltage CHLDOs) tries to drive positive, but is stopped because the current through inductor 305 is 'caught' by the lowest voltage CHLDO that has not yet been charged. Thus, inductor 305 starts to discharge to the attached CHLDOs (from the lowest voltage uncharged CHLDO to the highest voltage CHLDO) in the manner described above in connection with FIGS. 3-5. To summarize, each CHLDO either 'feeds from' the inductor current (during the charge phase) or 'catches' the inductor current (during the discharge phase), and then turns off its corresponding switch SW1 when the input voltage V_IN_P provided by the associated capacitor C1 reaches its upper threshold voltage. Thus, inductor 305 continuously supplies current to the attached CHLDOs during both the inductor charge and discharge cycles.

After all of the capacitors C1 in all of the attached CHLDOs have been charged, any remaining energy in inductor 305 is dumped into terminal M through rectifier 312 in the manner described above. As a result, capacitor 306 is charged to provide the desired bias voltage V_POS on terminal M (and thereby on the V_POS input terminals of the attached CHLDOs). A current-mode control loop (not shown) controls the current threshold of inductor 305 to have an energy value sufficient to provide power to support all attached CHLDOs (including switching and headroom losses), and also provide the desired bias voltage V_POS. Note that even though regulator 600 is a Buck regulator some, but not all, CHLDOs and also V_POS can be greater than the power source voltage V_SRC.

Figure 7A:
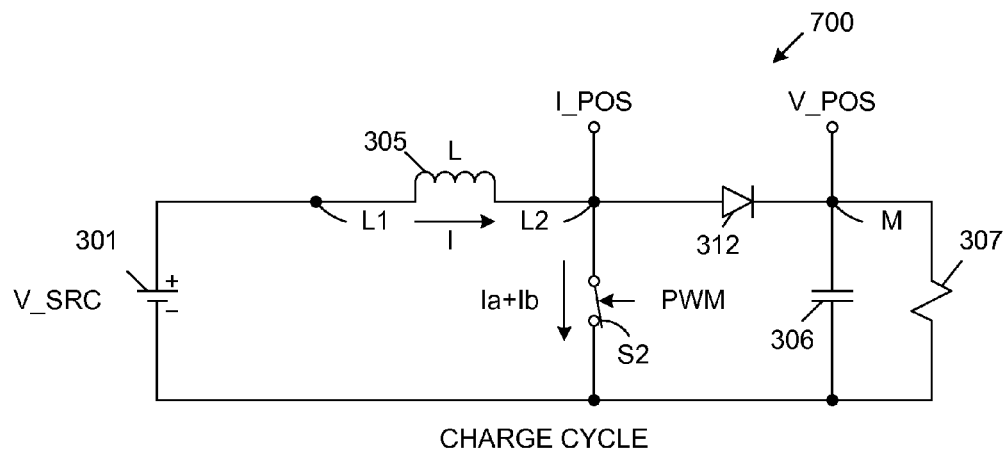
FIGS. 7A and 7B are circuit diagrams that illustrate charge and discharge cycles, respectively, of a positive output switch-mode power supply having a Boost controller type, which is used to power the CHLDOs of FIGS. 1, 2 and 4 in accordance with one embodiment of the present invention.
Figure 7B:
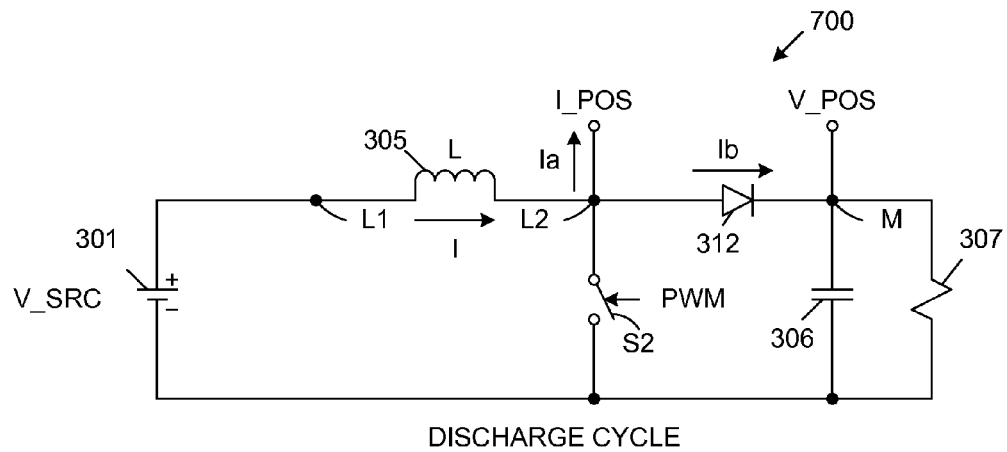

FIGS. 7A and 7B are circuit diagrams that illustrate charge and discharge cycles, respectively, of a switch-mode power supply 700 having a Boost controller type, which can be used to power the CHLDOs of FIGS. 1A, 1B, 2 and 4 in accordance with an alternate embodiment of the present invention. Switch-mode power supply 700 can supply CHLDOs having output voltages greater than the power source voltage V_SRC. However, the output voltage of each of the supplied CHLDOs must still be less than the bias voltage V_POS. Because switch-mode power supply 700 is similar to switch-mode power supply 300, similar elements in FIGS. 3A-3B and 7A-7B are labeled with similar reference numbers. Switch-mode power supply 700 eliminates the switch S1 from switch-mode power supply 300, such that the battery 301 is connected directly to inductor terminal L1. Switch-mode power supply 700 also eliminates the rectifier 311 from switch-mode power supply 300.

Switch-mode power supply 700 operates as follows in accordance with one embodiment of the present invention. Switch S2 is initially turned on in response to a rising edge of the PWM signal, thereby initiating a charge cycle as illustrated by FIG. 7A. Under these conditions, current (I=Ia+Ib) flows from the power source 301 through inductor 305 and switch S2. As a result, inductor 305 is charged from power source 301.

At the end of the inductor charge cycle, switch S2 is turned off in response to a falling edge of the PWM signal. At this time, inductor 305 starts to discharge to the attached CHLDOs (from the lowest voltage CHLDO to the highest voltage CHLDO) in the manner described above in connection with FIGS. 3-5. After all of the capacitors C1 in all of the attached CHLDOs have been charged, any remaining energy in inductor 305 is dumped into terminal M through rectifier 312 in the manner described above.

Negative Output CHLDOs

In accordance with another embodiment of the present invention, the above-described switch-mode power supplies 300 and 600, which implement Buck-Boost and Buck controller types, respectively, can be modified to also power CHLDOs having negative output voltages (V_OUT_N<0). Note that the switch-mode power supply 700, which has a Boost controller type, cannot power negative output voltage CHLDOs because this switch-mode power supply 700 does not catch the inductor current from inductor terminal L1 through a rectifier to ground during the discharge cycle (e.g., does not include rectifier 311).

Figure 8A:
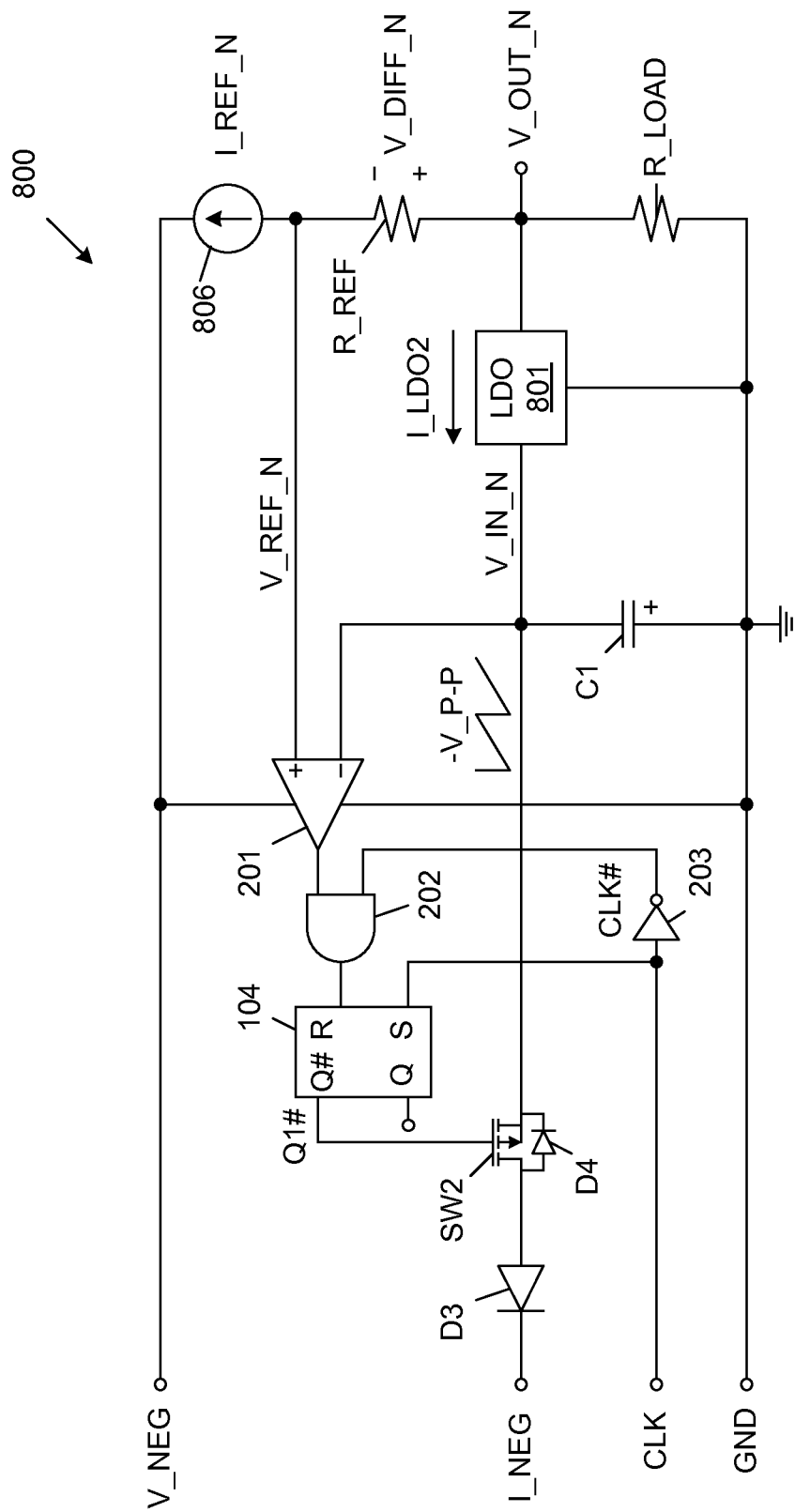
FIG. 8A is a circuit diagram of a negative voltage clocked CHLDO in accordance with one embodiment of the present invention.

FIG. 8A is a circuit diagram of a CHLDO 800 that provides a negative output voltage on an output terminal (V_OUT_N) in accordance with one embodiment of the present invention. Because CHLDO 800 is similar to CHLDO 200, similar elements are labeled with similar reference numbers in FIGS. 2 and 8A. Thus, clocked CHLDO 800 includes capacitor C1, load resistor R_LOAD, reference resistor R_REF, reset-set (R-S) flip-flop 104, comparator 201, AND gate 202, inverter 203 and input terminals CLK and GND, which are described above in connection with FIG. 2. CHLDO 800 also includes p-channel switching transistor SW2 (which replaces the n-channel switching transistor SW1 of CHLDO 200), rectifiers D3-D4 (which replace rectifiers D1-D2 of CHLDO 200), negative voltage LDO 801 (which replaces the positive voltage LDO 101 of CHLDO 200), reference current source 806 (which replaces the reference current source 106 of CHLDO 200), input terminals V_NEG and I_NEG (which replace input terminals V_POS and I_POS of CHLDO 200) and output terminal V_OUT_N (which replaces output terminal V_OUT_P of CHLDO 200). Reference current source 806, supplies a reference current I_REF_N to the V_NEG terminal, thereby creating a voltage drop V_DIFF_N across resistor R_REF. A negative bias voltage is applied to the input terminal V_NEG, wherein this negative bias voltage is more negative than the negative output voltage provided on output terminal V_OUT_N.

Note that the polarities of rectifiers D3 and D4 are reversed with respect to rectifiers D1 and D2, in view of the fact that a negative current charges capacitor C1. A current I_LDO2 flows through LDO 801 in a direction opposite that described above in connection with LDO 101. A negative input voltage V_IN_N is developed at the input of LDO 801, and the capacitor C1 charges with a reverse polarity (when compared with the capacitor C1 of CHLDO 200). A negative reference voltage V_REF_N, which is equal to V_OUT_N–V_DIFF_N, is applied to the positive input terminal of comparator 201. Moreover, the inverted Q output (Q#) of R-S flip-flop 104, which provides the switch control signal Q1#, is used to control switch SW2. Note that in one embodiment, a level translator (not shown) is provided at the inverted Q output of R-S flip flop 104, such that the control signal Q1# is driven to a negative voltage to turn on the p-channel switch SW2 (and to ground or a higher voltage to turn off the p-channel switch SW2). The sawtooth waveform labeled –V_P-P is inverted with respect to the corresponding waveform of positive voltage CHLDO 200.

In an alternate embodiment, the reference resistor R_REF and the reference current source 806 of CHLDO 200 may be replaced with the voltage source 105 and the bias resistor R_BIAS, respectively, as illustrated by FIG. 1A (although the polarity of the voltage source 105 would be reversed in this case).

Clocked CHLDO 800 operates as follows in accordance with one embodiment of the present invention. Initially, the input voltage V_IN_N is equal to the output voltage V_OUT_N, such that comparator 201 provides a logic low output to AND gate 202. The corresponding switch-mode power supply enters a charging mode in response to a low-to-high transition (rising edge) of the clock signal CLK. R-S flip-flop 104 is set in response to the rising edge of the clock signal CLK, such that the Q# output of flip-flop 104 (i.e., Q1#) is set to a logic low state, thereby turning on switch SW2. During the charge mode of the switch-mode power supply, the voltage on input terminal I_NEG is pulled up toward ground, such that rectifier diode D3 is reverse biased by the negative input voltage V_IN_N. Thus, even though switch SW2 is turned on, no current flows through this switch SW2 during the charge mode of the switch-mode power supply.

The switch-mode power supply subsequently enters a discharging mode. At this time, current flow in the switch-mode power supply's inductor drives the voltage on the input terminal I_NEG negative. When the voltage applied to the input terminal I_NEG becomes less than the input voltage V_IN_N, capacitor C1 charges, thereby causing the input voltage V_IN_N to become more negative.

When the input voltage V_IN_N becomes less than the negative reference voltage V_REF_N, the output of comparator 201 toggles to a logic high state. Note that the inverted clock signal CLK# also has a logic high state at this time (as the CLK signal is an impulse signal that transitions to a logic low state immediately after transitioning to a logic high state). As a result, the output provided by AND gate 202 also toggles to a logic high state. The rising edge of the output signal provided by AND gate 202 is applied to the reset terminal (R) of flip-flop 104. In response, the Q# output of R-S flip-flop 104 (i.e., Q1#) is reset to a logic high state, thereby turning off switch SW2. Under these conditions, current flow from capacitor C1 to the input terminal I_NEG is stopped, and capacitor C1 supplies (negative) energy to LDO 801. Capacitor C1 continues supplying (negative) energy to LDO 801 until the next low-to-high transition of the clock signal CLK. At this time, the above-described cycle repeats.

Within clocked CHLDO 800, the minimum ripple voltage (−V_P-P) of the input voltage V_IN_N applied to the input terminal of LDO 801 is still determined by Equation 2 but with −V_P-P and I_LDO2 replacing the V_P-P and I_LDO terms respectively.

The various circuit elements of clocked CHLDO 800 are designed/sized such that the maximum expected value of the input voltage V_IN_N during normal operating conditions (i.e., V_OUT_N−V_DIFF_N+V_P−P+noise & transient voltages) is less than the dropout voltage of LDO 801 with some margin to spare.

The various circuit elements of CHLDO 800 are also designed/sized such that the minimum expected value of the input voltage V_IN_N during normal operating conditions (i.e., V_OUT_N−V_DIFF_N) is close to the output voltage V_OUT_N of LDO 801, such that the efficiency of LDO 801 is maintained at a high value. In one embodiment, the minimum expected value of the output voltage V_OUT_N is about 91% of the input voltage V_IN_N, such that the efficiency of LDO 801 is maintained at about 91%. Note that LDO 801 operates in a highly linear manner under these conditions.

Figure 8B:
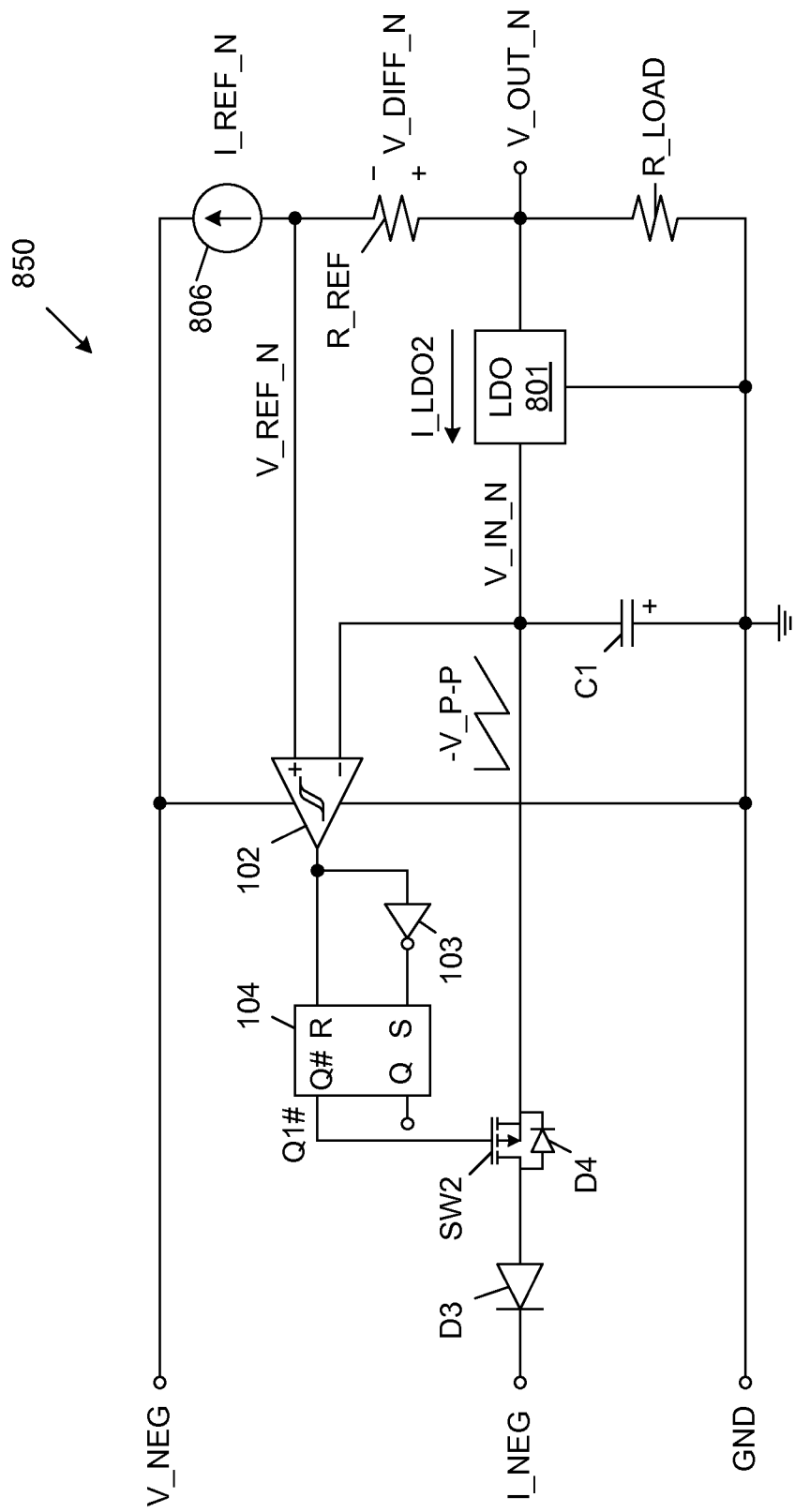
FIG. 8B is a circuit diagram of a negative voltage un-clocked CHLDO in accordance with one embodiment of the present invention.

In an alternate embodiment, negative voltage CHLDO 800 may be modified in accordance with the teachings of FIGS. 1A-1B to operate as an un-clocked negative voltage CHLDO. FIG. 8B is a circuit diagram of an un-clocked negative voltage CHLDO 850 in accordance with one embodiment of the present invention. CHLDO 850 is similar to CHLDO 800 (FIG. 8A). However, CHLDO 850 does not receive the clock signal CLK (and therefore does not require the AND gate 202 and the inverter 203). CHLDO 850 also replaces the comparator 201 with the comparator 102 (which includes hysteresis, and has been described above in connection with FIGS. 1A and 1B. The input pins have a reversed polarity with respect to FIG. 1A.) The output of comparator 102 is connected to the reset terminal (R) of flip-flop 104. Inverter 103 connects the output of comparator 102 to the set terminal (S) of flip-flop 104. Thus, comparator 102 is connected to flip-flop 104 in the same manner described above in connection with FIGS. 1A and 1B. CHLDO 850 operates to generate a negative output voltage V_OUT_N in an un-clocked manner consistent with the descriptions provided above in connection with FIGS. 1A, 1B and 8A.

Figure 9:
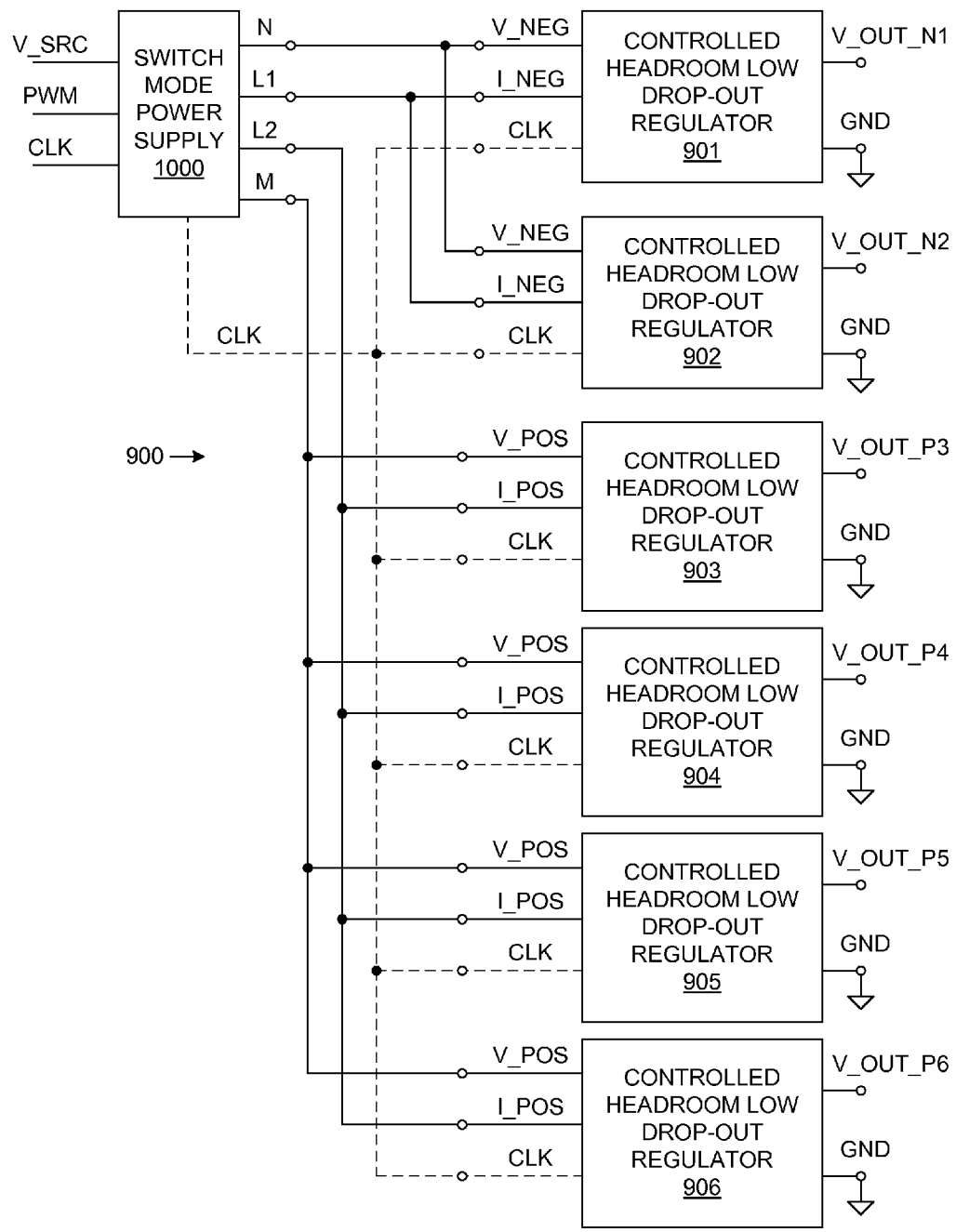
FIG. 9 is a block diagram of a single-inductor, multiple output (SIMO) power supply system, which includes both negative output voltage CHLDOs and positive output voltage CHLDOs connected to a switch-mode power supply in accordance with one embodiment of the present invention.

FIG. 9 is a block diagram of a single-inductor, multiple output (SIMO) power supply system 900, which includes two negative output voltage CHLDOs 901-902 and four positive output voltage CHLDOs 903-906 connected to a switch-mode power supply 1000. In accordance with one embodiment, CHLDOs 901-906 may be clocked CHLDOs, un-clocked CHLDOs or any combination thereof. CHLDOs 901-906 are configured to provide six different output voltages V_OUT_N1, V_OUT_N2, V_OUT_P3, V_OUT_P4, V_OUT_P5 and V_OUT_P6, respectively. In accordance with one embodiment, these output voltages may be defined as follows: V_OUT_P6>V_OUT_P5>V_OUT_P4>V_OUT_P3>0>V_OUT_N1>V_OUT_N2. Although six CHLDOs 901-906 are illustrated in FIG. 9, it is understood that other numbers of CHLDOs may be supplied from switch-mode power supply 1000 in other embodiments. It is also understood that there may be other numbers of negative voltage CHLDOs and positive voltage CHLDOs coupled to the same power supply. However, as described in more detail below, if switch-mode power supply 1000 supplies power to both negative and positive voltage CHLDOs, the total energy used by the positive voltage CHLDOs (including the bias voltage V_POS) must be greater than the total energy used by the negative voltage CHLDOs (including the bias voltage V_NEG), i.e., S3 must be turned back on before the inductor has fully discharged.

Figure 10A:
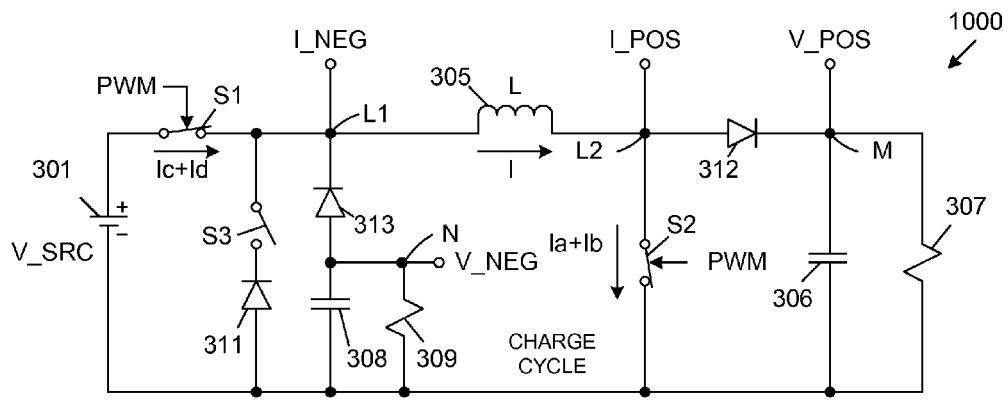
FIGS. 10A, 10B and 10C are circuit diagrams that illustrate charge and discharge cycles of a switch-mode power supply having a Buck-Boost controller type, which is used to simultaneously power both positive and negative voltage CHLDOs in accordance with one embodiment of the present invention.
Figure 10B:
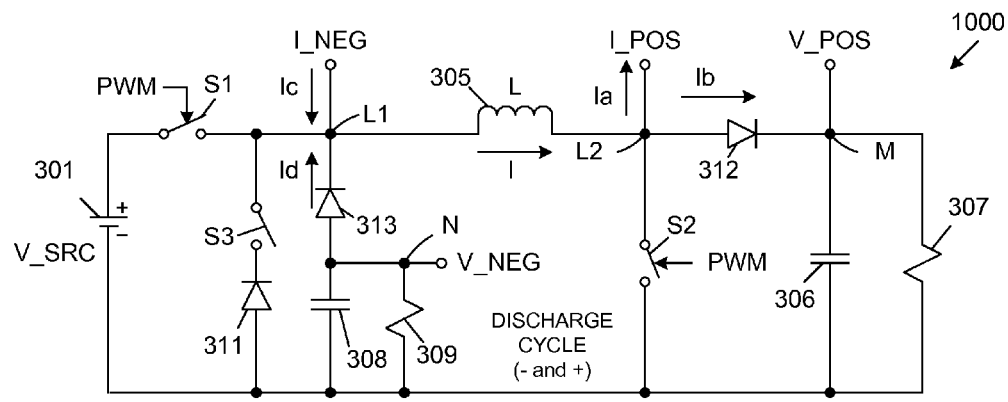
Figure 10C:
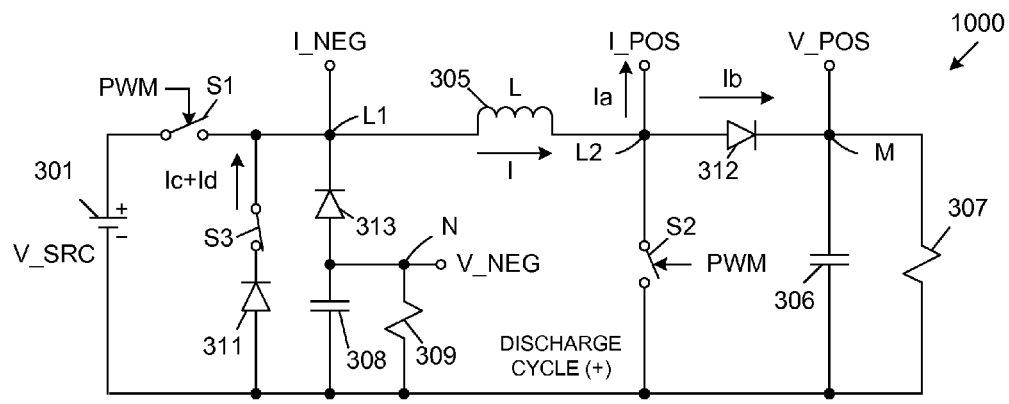

FIGS. 10A, 10B and 10C are circuit diagrams that illustrate a charge cycle, a positive/negative discharge cycle and a positive discharge cycle, respectively, of a switch-mode power supply 1000 having a Buck-Boost controller type, which can be used to power the negative voltage CHLDOs 901-902 and the positive voltage CHLDOs 903-906 in accordance with one embodiment of the present invention. Switch-mode power supply 1000 can supply CHLDOs having output voltage magnitudes less than or greater than the power source voltage V_SRC. Because switch-mode power supply 1000 is similar to switch-mode power supply 300, similar elements in FIGS. 3A-3B and 10A-10C are labeled with similar reference numbers. In FIGS. 10A-10C, the inductor current (I)=(Ia+Ib)=(Ic+Id). In addition to the above-described elements of switch-mode power supply 300, switch-mode power supply 1000 includes an additional switch S3 connected between the inductor terminal L1 and the cathode of rectifier 311. Switch-mode power supply 1000 also includes capacitor 308, resistor 309 and rectifier 313, which are connected as illustrated to generate a negative bias voltage on the V_NEG input terminals of the connected negative voltage CHLDOs 901-902.

Switch-mode power supply 1000 operates as follows in accordance with one embodiment of the present invention. Switches S1 and S2 are initially turned on (closed) in response to a rising edge of the PWM signal, and switch S3 is initially turned off (opened), thereby initiating a charge cycle as illustrated by FIG. 10A. This charge cycle proceeds in the same manner described above in connection with switch-mode power supply 300 (FIG. 3A).

At the end of the inductor charge cycle, switches S1 and S2 are turned off in response to the falling edge of the PWM signal, thereby initiating a negative discharge phase. Because switch S3 remains open, inductor terminal L1 is not tied to ground through rectifier 311. Thus, while inductor terminal L2 is 'flying positive' in the manner described above, the inductor terminal L1 is 'flying negative'. At this time, inductor terminal L2 reaches a positive voltage that allows the capacitor C1 within the attached CHLDO having the lowest positive output voltage (e.g., CHLDO 903) to be charged from inductor 305. Simultaneously, inductor terminal L1 reaches a negative voltage that allows the capacitor C1 within the attached CHLDO having the negative output voltage closest to ground (e.g., CHLDO 901) to be charged from inductor 305. This portion of the discharge cycle is hereinafter referred to as the negative discharge phase (even though both positive and negative CHLDOs are charged during this portion of the discharge cycle). The capacitors C1 present in the negative voltage CHLDOs are sequentially charged from the negative voltage CHLDO closest to ground to the negative voltage CHLDO farthest from ground (i.e., in the same manner that the capacitors C1 in the positive voltage CHLDOs are charged). Note that it is not necessary for the positive and negative voltage CHLDOs to have the same charging periods. For example, the lowest positive voltage CHLDO may be charged, and charging of the next lowest positive voltage CHLDO may begin, even if the first negative voltage CHLDO has not completed charging.

During the negative discharge phase, rectifier 311 and switch S3 effectively 'disappear' from the positive voltage CHLDO loss calculations, thereby causing the overall efficiency for the positive and negative voltage CHLDO sets to be better than the efficiency of a single positive voltage CHLDO.

After the capacitors C1 in all of the attached negative voltage CHLDOs 901-902 have been charged, capacitor 308 within switch-mode power supply 1000 is charged from inductor 305, such that the desired negative bias voltage can be supplied to the negative voltage bias terminal V_NEG. In the described embodiments, the negative bias voltage applied to the V_NEG terminal is more negative than the output voltages (V_OUT_N1, V_OUT_N2) provided by any attached negative voltage CHLDO. When the voltage on the V_NEG terminal reaches the desired negative voltage, switch S3 is closed, thereby initiating the positive discharge phase (FIG. 10C). During the positive discharge phase, any uncharged positive voltage CHLDOs are charged in response to the energy remaining in inductor 305. Note that this embodiment requires that V_NEG must be finished charging before V_POS finishes charging.

After all of the capacitors C1 in all of the attached positive voltage CHLDOs 903-906 have been charged, any remaining energy in inductor 305 is dumped into terminal M through rectifier 312, such that capacitor 306 is charged to provide the bias voltage V_POS. Thus, after charging all of the negative and positive voltage CHLDOs and V_NEG (i.e., inductor 308), there must be enough energy remaining in inductor 305 to finish powering the V_POS voltage.

Figure 11:
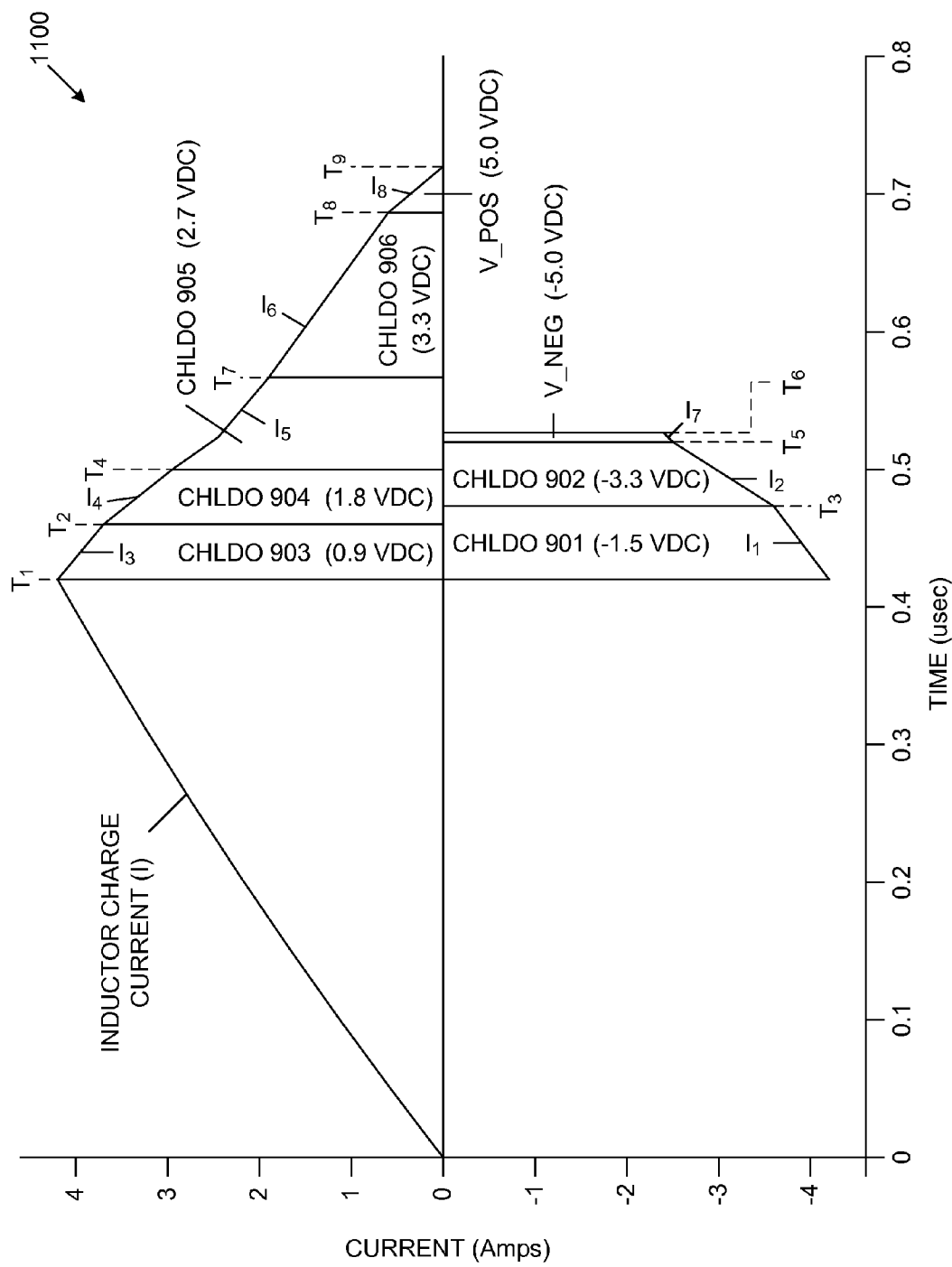
FIG. 11 is a waveform diagram illustrating currents through the switch-mode power supply and multiple CHLDOs of FIG. 9 during a charge cycle, a negative discharge cycle, and a positive discharge cycle in accordance with one embodiment of the present invention.

FIG. 11 is a waveform diagram 1100 illustrating the current (I) through inductor 305 during the charge cycle (Time=0 to T1), the negative discharge phase (Time=T1-T6) and positive discharge phase (Time=T6-T9) of SIMO power supply system 900 in accordance with one embodiment of the present invention. In this example, CHLDOs 901, 902, 903, 904, 905 and 906 have output voltages V_OUT_N1, V_OUT_N2, V_OUT_P3, V_OUT_P4, V_OUT_P5 and V_OUT_P6 equal to −1.5 Volts, −3.3 Volts, 0.9 Volts, 1.8 Volts, 2.7 Volts, and 3.3 Volts, respectively. The bias voltages V_POS and V_NEG have voltages of 5.0 Volts and −5.0 Volts, respectively, in the illustrated embodiment. FIG. 11 also illustrates the currents that charge the capacitors C1 within CHLDOs 901-906, which are labeled $I_1$-$I_6$, respectively, and the currents that charge capacitors 308 and 306, which are labeled $I_7$ and $I_8$, respectively.

At time T=0, the PWM signal (and the clock signal CLK) transitions to a logic high state and inductor 305 begins charging. At time T1, the PWM signal transitions to a logic low state, and inductor 305 begins discharging through the CHLDO having the lowest designated positive output voltage and the CHLDO having the highest designated negative output voltage. In the described example, CHLDO 903 has the lowest designated positive output voltage (i.e., 0.9 Volts), and CHLDO 901 has the highest designated negative output voltage (i.e., −1.5 Volts). Inductor 305 drives the voltage on inductor terminal L1 to a level sufficient to induce a charging current $I_1$ to flow through the charging capacitor C1 in CHLDO 901 (i.e., a voltage slightly below −1.5 Volts, but above −3.3 Volts). Inductor 305 simultaneously drives the voltage on inductor terminal L2 to a level sufficient to induce a charging current $I_3$ to flow into the charging capacitor C1 in CHLDO 903 (i.e., a voltage slightly above 0.9 Volts, but below 1.8 Volts).

At time T2, the input voltage V_IN_P of the capacitor C1 within CHLDO 903 has been charged to the predetermined voltage of V_OUT_P3+V_DIFF_P, thereby causing the switch SW1 within CHLDO 903 to be turned off in the manner described above. At this time (T2), the charging current $I_3$ within CHLDO 903 is reduced to zero.

Also at time T2, the inductor 305 begins discharging through the CHLDO having the next lowest designated positive output voltage. In the described example, CHLDO 904 has the next lowest designated positive output voltage (i.e., 1.8 Volts). Inductor 305 drives the voltage on inductor terminal L2 to a level sufficient to induce a charging current $I_4$ to flow into the charging capacitor C1 within CHLDO 904 (i.e., a voltage slightly above 1.8 Volts, but below 2.7 Volts). As a result, the charging current $I_4$ within CHLDO 904 increases from zero to the level of the inductor current 305 at time T2.

At time T3, the input voltage V_IN_N of the capacitor C1 within CHLDO 901 has been charged to the predetermined voltage of V_OUT_N1−V_DIFF_N, thereby causing the switch SW2 within CHLDO 901 to be turned off in the manner described above. At this time (T3), the charging current $I_1$ within CHLDO 901 becomes zero.

Also at time T3, the inductor 305 begins discharging through the CHLDO having the next highest designated negative output voltage. In the described example, CHLDO 902 has the next highest designated negative output voltage (i.e., −3.3 Volts). Inductor 305 drives the voltage on inductor terminal L1 to a level sufficient to induce a charging current $I_2$ to flow through the charging capacitor C1 within CHLDO 902 (i.e., a voltage slightly below −3.3 Volts, but above −5.0 Volts). As a result, the charging current $I_2$ within CHLDO 902 decreases from zero to the level of the inductor current 305 at time T3.

At time T4, the input voltage V_IN_P of the capacitor C1 within CHLDO 904 has been charged to the predetermined voltage V_OUT_P4+V_DIFF_P, thereby causing the switch SW1 within CHLDO 904 to be turned off in the manner described above. At this time (T4), the charging current $I_4$ within CHLDO 904 is reduced to zero.

Also at time T4, the inductor 305 begins discharging through the CHLDO having the next lowest designated positive output voltage. In the described example, CHLDO 905 has the next lowest designated positive output voltage (i.e., 2.7 Volts). Inductor 305 drives the voltage on inductor terminal L2 to a level sufficient to induce a charging current $I_5$ to flow through the charging capacitor C1 within CHLDO 905 (i.e., a voltage slightly above 2.7 Volts, but below 3.3 Volts). As a result, the charging current $I_5$ within CHLDO 905 increases from zero to the level of the inductor current 305 at time T4.

At time T5, the input voltage V_IN_N of the capacitor C1 within CHLDO 902 has been charged to the predetermined voltage of V_OUT_N2−V_DIFF_N, thereby causing the switch SW2 within CHLDO 902 to be turned off in the manner described above. At this time (T5), the charging current $I_2$ within CHLDO 902 becomes zero.

Also at time T5, the inductor 305 begins charging the capacitor 308 (with current $I_7$) within switch-mode power supply 1000. In the example of FIG. 11, capacitor 308 is charged to a voltage of about −5.0 Volts during time period from T5 to T6. Note that the negative discharge phase is thereby completed at time T6 and switch S3 is closed and the negative inductor current flows through Diode 311 instead.

As illustrated in FIG. 11, the positive voltage CHLDO 905 completes charging at time T7. The capacitor C1 in the remaining positive voltage CHLDO 906 charges in response to current $I_6$ from time T7 to time T8. Capacitor 306 within switch-mode power supply 1000 is then charged (with current $I_8$) from inductor 305 to a voltage of about 5.0 Volts during time period from T8 to T9.

Figure 12A:
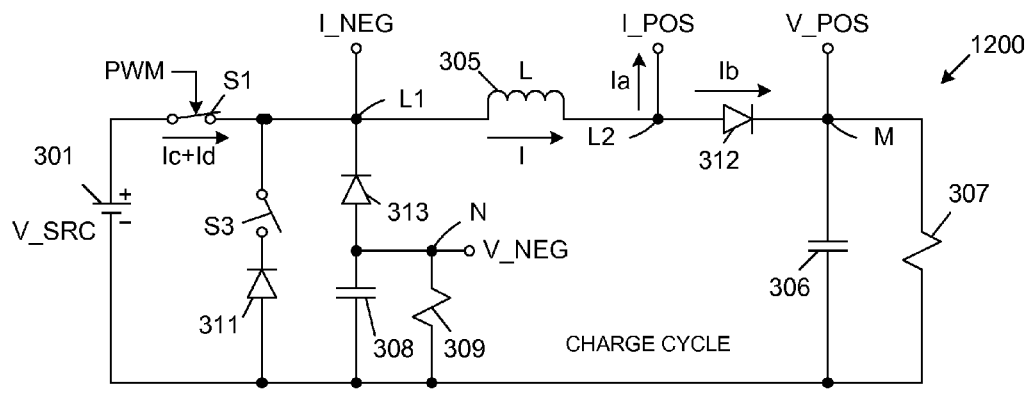
FIGS. 12A, 12B and 12C are circuit diagrams that illustrate charge and discharge cycles of a switch-mode power supply having a Buck controller type, which is used to simultaneously power both positive and negative voltage CHLDOs in accordance with one embodiment of the present invention.
Figure 12B:
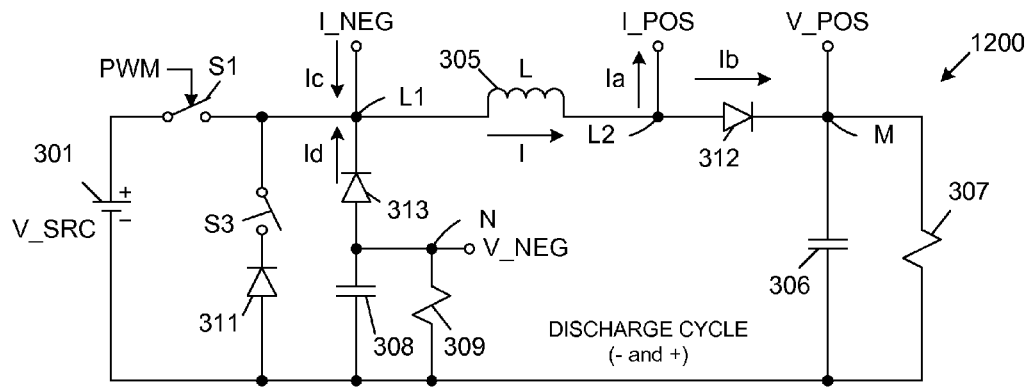
Figure 12C:
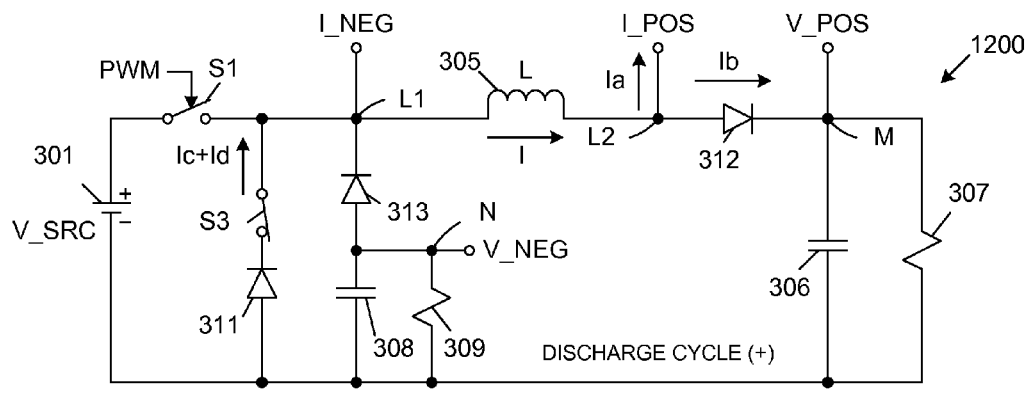

FIGS. 12A, 12B and 12C are circuit diagrams that illustrate a charge cycle, a positive/negative discharge phase and a positive discharge phase, respectively, of a switch-mode power supply 1200 having a Buck controller type, which can be used to power the negative voltage CHLDOs 901-902 and the positive voltage CHLDOs 903-906, in accordance with an alternate embodiment of the present invention. Because switch-mode power supply 1200 is similar to switch-mode power supply 600, similar elements in FIGS. 6A-6B and 12A-12C are labeled with similar reference numbers. In FIGS. 12A-12C, the inductor current (I)=(Ia+Ib)=(Ic+Id). In addition to the above-described elements of switch-mode power supply 600, switch-mode power supply 1200 includes an additional switch S3 connected between the inductor terminal L1 and the cathode of rectifier 311. Switch-mode power supply 1200 also includes a capacitor 308, a resistor 309 and a rectifier 313, which are connected as illustrated to generate a negative bias voltage on the V_NEG input terminals of the connected negative voltage CHLDOs 901-902.

Switch-mode power supply 1200 operates as follows in accordance with one embodiment of the present invention. Switch S1 is initially turned on in response to a rising edge of the PWM signal, and switch S3 is initially turned off, thereby initiating a charge cycle as illustrated by FIG. 12A. This charge cycle proceeds in the same manner described above in connection with switch-mode power supply 600 (FIG. 6A). Thus, during the inductor charge cycle, the positive voltage CHLDOs 903-906 are charged, starting with the lowest positive voltage CHLDO 903 to the highest positive voltage CHLDO 906. Note that the negative voltage CHLDOs 901-902 are not charged during the inductor charge cycle.

At the end of the inductor charge cycle switch S1 is turned off in response to a falling edge of the PWM signal. Because switch S3 remains open, inductor terminal L1 is not tied to ground through rectifier 311. Thus, while inductor terminal L2 is 'flying positive' in the manner described above, the inductor terminal L1 is 'flying negative'. At this time, the capacitors C1 within negative voltage CHLDOs 901-902 coupled to inductor terminal L1 are sequentially charged, and the capacitors C1 within positive voltage CHLDOs 903-906 coupled to inductor terminal L2 are also sequentially charged, in the manner described above in connection with FIG. 10B.

After the capacitors C1 in all of the attached negative voltage CHLDOs 901-902 have been charged, capacitor 308 within switch-mode power supply 1200 is charged from inductor 305, such that the desired negative bias voltage can be supplied to the negative voltage bias terminal V_NEG. In the described embodiments, the negative bias voltage applied to the V_NEG terminal is more negative than the output voltage (V_OUT_N) provided by any attached negative voltage CHLDO. When the voltage on the V_NEG terminal reaches the desired negative voltage, switch S3 is closed, thereby initiating the positive discharge phase (FIG. 12C). During the positive discharge phase, any uncharged positive voltage CHLDOs are charged in response to the energy remaining in inductor 305. Note that this embodiment requires that V_NEG must be finished charging before V_POS finishes charging.

After all of the capacitors C1 in all of the attached positive voltage CHLDOs have been charged, any remaining energy in inductor 305 is dumped into terminal M through rectifier 312, such that capacitor 306 is charged to provide the bias voltage V_POS. Thus, after charging all of the negative and positive voltage CHLDOs, there must be enough energy remaining in inductor 305 to finish powering the V_POS voltage.

Figure 13:
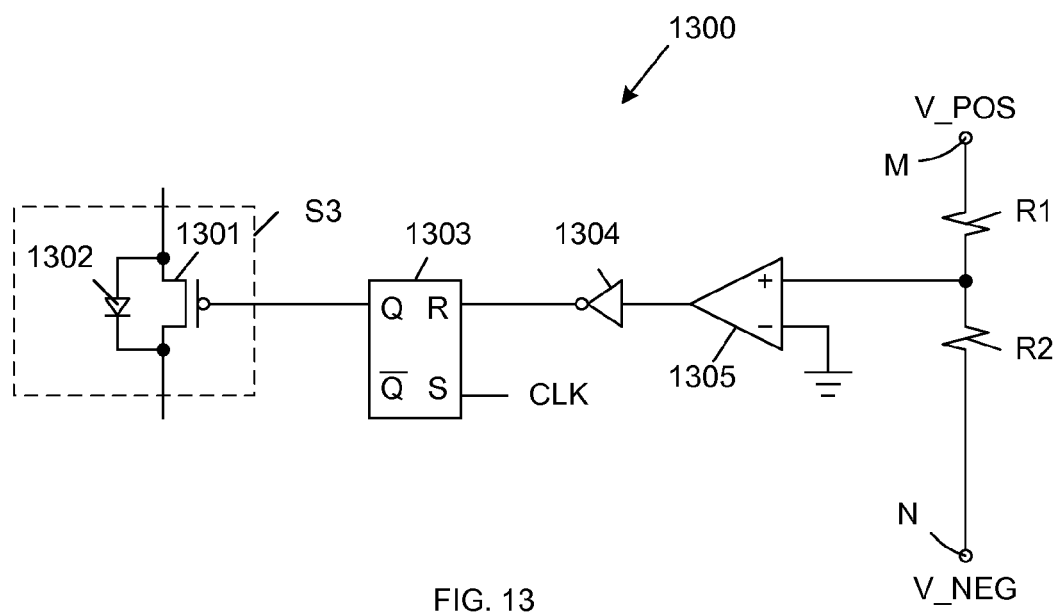
FIG. 13 is a circuit diagram of a control circuit that may be used to control switching in the circuits of FIGS. 10A-10C and 12A-12C in accordance with one embodiment of the present invention.

FIG. 13 is a circuit diagram of a control circuit 1300 that may be used to control switch S3 in accordance with one embodiment of the present invention. In this embodiment, switch S3 includes a p-channel transistor 1301 and a rectifier 1302. P-channel transistor 1301 has a gate coupled to the Q output of R-S flip-flop 1303. The reset input terminal of R-S flip-flop 1303 is coupled to the output terminal of inverter 1304, and the set input terminal of R-S flip-flop 1303 is coupled to receive the clock signal CLK. The input of inverter 1304 is coupled to the output of a comparator 1305. The negative input terminal of the comparator is coupled to ground and the positive input terminal of comparator 1305 is coupled to a voltage divider circuit, which includes resistors R1 and R2 coupled between the positive bias voltage terminal M (V_POS) and the negative bias voltage terminal N (V_NEG). At the start of each cycle, the rising edge of the clock signal CLK sets flip-flop 1303, such that the Q output is driven high, thereby turning off p-channel transistor 1301 (i.e., switch S3). When the negative voltage CHLDOs 901-902 and capacitor 308 (i.e., V_NEG) are fully charged in the manner described above, the voltage on the positive input terminal of comparator 1305 is pulled down below 0 Volts, thereby causing the output of comparator 1305 to go low, such that inverter 1304 drives the reset input (R) of flip-flop 1303 high. Under these conditions, the Q output of flip-flop 1303 is driven low, thereby turning on p-channel transistor 1301 (i.e., switch S3) to initiate the discharge cycles illustrated by FIGS. 10C and 12C. When the positive voltage CHLDOs 903-906 and the capacitor 306 (i.e., V_POS) are subsequently fully charged in the manner described above, the voltage on the positive input terminal of comparator 1305 is pulled up above 0 Volts, thereby causing the output of comparator 1305 to go high prior to the next rising edge of the clock signal CLK.

Although the present invention has been described in connection with various embodiments, it is understood that variations of these embodiments would be obvious to one of ordinary skill in the art. For example, although the present invention has been described in connection with systems using positive voltage CHLDOs (FIG. 4) and positive and negative voltage CHLDOs (FIG. 9), it is understood that systems using only negative voltage CHLDOs can be implemented in accordance with the teachings of the present disclosure. Thus, the present invention is limited only by the following claims.

I claim:

1. A controlled headroom low dropout regulator (CHLDO) comprising:
    a low dropout regulator (LDO) having an input terminal and an output terminal, wherein an output voltage (V_OUT_P) of the CHLDO is provided on the output terminal of the LDO;
    a capacitor (C1) coupled to the input terminal of the LDO;
    a voltage source that adds an incremental voltage (V_DIFF) to the output voltage of the CHLDO, thereby providing a reference voltage (V_REF);
    a comparator having a first input terminal coupled to receive the reference voltage and a second input terminal coupled to receive an input voltage (V_IN_P) from the input terminal of the LDO, wherein the comparator exhibits a hysteresis voltage V_H;
    a current input terminal I_POS that receives an input current;
    a switch coupled between the current input terminal and the input terminal of the LDO, the switch having a control terminal coupled to an output terminal of the comparator, wherein the switch is turned on when the input voltage of the LDO is less than the reference voltage by more than the hysteresis voltage, and wherein the switch is turned off when the input voltage of the LDO is greater than the reference voltage.

2. The CHLDO of claim 1, wherein the incremental voltage is 0.3 Volts or less.

3. The CHLDO of claim 1, wherein the LDO has a specified minimum voltage on the input terminal, wherein the reference voltage minus the hysteresis voltage is greater than the specified minimum voltage.

4. The CHLDO of claim 1, wherein the incremental voltage is 15 percent or less of the output voltage of the CHLDO.

5. The CHLDO of claim 1, further comprising a rectifier diode connected between the current input terminal and the switch, thereby inhibiting current flow from the capacitor to the current input terminal.

6. The CHLDO of claim 1, further comprising a bias voltage terminal (V_POS) that supplies a bias voltage, wherein the bias voltage terminal is coupled to the voltage supply, and wherein the bias voltage is greater than the output voltage of the CHLDO.

7. A controlled headroom low dropout regulator (CHLDO) comprising:
    a low dropout regulator (LDO) having an input terminal and an output terminal, wherein an output voltage (V_OUT_P) of the CHLDO is provided on the output terminal of the LDO;
    a capacitor (C1) coupled to the input terminal of the LDO;
    a voltage source that adds an incremental voltage (V_DIFF) to the output voltage of the CHLDO, thereby providing a reference voltage (V_REF);
    a comparator having a first input terminal coupled to receive the reference voltage and a second input terminal coupled to receive an input voltage (V_IN_P) from the input terminal of the LDO;
    a current input terminal I_POS that receives an input current;
    a clock input terminal that receives a clock signal;
    a switch coupled between the current input terminal and the input terminal of the LDO;
    sequential logic coupled to the clock input terminal, an output of the comparator and the switch, wherein the sequential logic enables the switch at a first edge of the clock signal, and disables the switch after a second edge of the clock signal, when the input voltage exceeds the reference voltage.

8. The CHLDO of claim 7, wherein the incremental voltage is 0.3 Volts or less.

9. The CHLDO of claim 7, wherein the incremental voltage is 15 percent or less of the output voltage of the CHLDO.

10. The CHLDO of claim 7, further comprising a rectifier diode connected between the current input terminal and the switch, thereby inhibiting current flow from the capacitor to the current input terminal.

11. The CHLDO of claim 7, further comprising a bias voltage terminal (V_POS) that supplies a bias voltage, wherein the bias voltage terminal is coupled to the voltage supply, and wherein the bias voltage is greater than the output voltage of the CHLDO.

12. The CHLDO of claim 7, wherein the sequential logic comprises:
    a logical AND gate having a first input terminal coupled to the output of the comparator and a second input terminal coupled to the clock input terminal; and
    a reset-set flip-flop having a set input terminal coupled to the clock input terminal, a reset input terminal coupled to an output of the logical AND gate, and an output terminal coupled to the control terminal of the switch.

13. A method of operating a low dropout regulator (LDO) comprising:
    supplying an input voltage of the LDO from a capacitor;
    adding an incremental voltage to an output voltage of the LDO to create a reference voltage;
    comparing the reference voltage with the input voltage of the LDO, and in response, generating a switch control signal (Q1);
    coupling the capacitor to a current supply terminal if the input voltage of the LDO becomes less than the reference voltage by a hysteresis voltage; and
    de-coupling the capacitor from the current supply terminal if the input voltage of the LDO is greater than the reference voltage.

14. The method of claim 13, wherein the incremental voltage is 0.3 Volts or less.

15. The method of claim 13, wherein the LDO has a specified minimum voltage on the input terminal, wherein the reference voltage minus the hysteresis voltage is greater than the specified minimum voltage.

16. The method of claim 13, wherein the incremental voltage is 15 percent or less of the output voltage of the CHLDO.

17. The method of claim 13, further comprising generating the incremental voltage in response to a bias voltage, wherein the bias voltage is greater than the output voltage of the LDO.

18. A method of operating a low dropout regulator (LDO) comprising:
    supplying an input voltage of the LDO from a capacitor;
    adding an incremental voltage to an output voltage of the LDO to create a reference voltage;
    comparing the reference voltage with the input voltage of the LDO, and in response, generating a switch control signal (Q1);
    coupling the capacitor to a current supply terminal in response to a first edge of a clock signal; and
    de-coupling the capacitor from the current supply terminal in response to the input voltage of the LDO becoming greater than the reference voltage after a second edge of the clock signal.

19. The method of claim 18, wherein the incremental voltage is 0.3 Volts or less.

20. The method of claim 18, wherein the incremental voltage is 15 percent or less of the output voltage of the CHLDO.

21. The method of claim 18, further comprising generating the incremental voltage in response to a bias voltage, wherein the bias voltage is greater than the output voltage of the LDO.

22. A single-inductor multiple output (SIMO) power supply comprising:
    an inductor;
    a control circuit that charges the inductor during a first phase of a clock signal and discharges the inductor during a second phase of the clock signal;
    a first plurality of controlled overhead low dropout regulators (CHLDOs), each having a corresponding rectifier coupled to the inductor, each having a corresponding capacitor for providing an input voltage, and each having means for coupling the corresponding capacitor to the corresponding rectifier during the first phase of the clock signal, and means for de-coupling the corresponding capacitor from the corresponding rectifier during the second phase of the clock signal when a voltage developed on the corresponding capacitor becomes greater than a predetermined reference voltage assigned to the CHLDO.

23. The SIMO power supply of claim 22, wherein each of the CHLDOs has a different predetermined reference voltage.

24. The SIMO power supply of claim 23, wherein each predetermined reference voltage is a positive voltage.

25. The SIMO power supply of claim 22, further comprising a second plurality of controlled overhead low dropout regulators (CHLDOs), each having a corresponding rectifier coupled to the inductor, each having a corresponding capacitor for providing an input voltage, and each having means for coupling the corresponding capacitor to the corresponding rectifier during the first phase of the clock signal, and means for de-coupling the corresponding capacitor from the corresponding rectifier during the second phase of the clock signal when a voltage developed on the corresponding capacitor becomes less than a predetermined reference voltage assigned to the CHLDO.

26. The SIMO power supply of claim 25, wherein the first plurality of CHLDOs are coupled to a first terminal of the inductor, and the second set of CHLDOs are coupled to a second terminal of the inductor.

27. The SIMO power supply of claim 25, wherein the predetermined reference voltages of the first plurality of CHLDOs are positive voltages, and the predetermined reference voltages of the second plurality of CHLDOs are negative voltages.

28. The SIMO power supply of claim 25, wherein the control circuit includes:

a supply capacitor that is charged to a predetermined negative voltage to supply the second plurality of CHLDOs; and a switch that is maintained in a first state until the supply capacitor is charged to the predetermined negative voltage, and is switched to a second state in response to the supply capacitor charging to the predetermined negative voltage, wherein the supply capacitor is prevented from charging when the switch is in the second state.

29. The SIMO power supply of claim 22, wherein the control circuit is of a Buck controller type.

30. The SIMO power supply of claim 22, wherein the control circuit is of a Boost controller type.

31. The SIMO power supply of claim 22, wherein the control circuit is of a Buck-Boost controller type.

32. The SIMO power supply of claim 22, wherein the control circuit includes means for charging a capacitor to create a bias voltage, and wherein each of the CHLDOs further comprises means for creating the corresponding predetermined reference voltage in response to the bias voltage.

* * * * *